(12) United States Patent
Retter

(10) Patent No.: US 8,805,763 B2
(45) Date of Patent: Aug. 12, 2014

(54) COMPUTERIZED SYSTEM FOR MONITORING AND CONTROLLING PHYSICAL DATA-PRODUCING APPARATUS

(75) Inventor: Alon Retter, Shoham (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 13/977,344

(22) PCT Filed: Dec. 19, 2011

(86) PCT No.: PCT/IL2011/050067
§ 371 (c)(1),
(2), (4) Date: Jun. 28, 2013

(87) PCT Pub. No.: WO2012/090199
PCT Pub. Date: Jul. 5, 2012

(65) Prior Publication Data
US 2013/0325785 A1    Dec. 5, 2013

(30) Foreign Application Priority Data
Dec. 29, 2010    (IL) .......................... 210358

(51) Int. Cl.
*G06F 17/00* (2006.01)
*G06N 5/02* (2006.01)
(52) U.S. Cl.
CPC . *G06N 5/02* (2013.01); *G06K 9/053* (2013.01)
USPC .......................................................... 706/46
(58) Field of Classification Search
USPC .......................................................... 706/46
See application file for complete search history.

(56) References Cited

U.S. PATENT DOCUMENTS

| | | | |
|---|---|---|---|
| 4,204,225 A | 5/1980 | Mistretta | |
| 5,060,392 A | 10/1991 | Grasso | |
| 7,222,302 B2* | 5/2007 | Hauser et al. | 715/734 |
| 7,724,724 B2* | 5/2010 | Yoshida et al. | 370/349 |
| 7,813,822 B1* | 10/2010 | Hoffberg | 700/94 |
| 7,885,976 B2* | 2/2011 | Bhattacharjee et al. | 707/787 |
| 7,974,714 B2* | 7/2011 | Hoffberg | 700/94 |
| 8,080,819 B2* | 12/2011 | Mueller et al. | 257/13 |
| 8,094,600 B2* | 1/2012 | Yoshida et al. | 370/312 |
| 8,116,263 B2* | 2/2012 | Yoshida et al. | 370/328 |
| 8,207,821 B2* | 6/2012 | Roberge et al. | 340/9.11 |
| 8,320,831 B2* | 11/2012 | Hashimoto et al. | 455/41.1 |

(Continued)

OTHER PUBLICATIONS

Scargle, J.D., "Studies in Astronomical Time Series Analysis. II. Statistical Aspects of Spectral Analysis of Unevely Spaced Data," *The Astrophysical Journal*, Dec. 15, 1982, pp. 835-853, vol. 263.

(Continued)

*Primary Examiner* — Michael B Holmes
(74) *Attorney, Agent, or Firm* — Oliff PLC

(57) ABSTRACT

A computerized system for monitoring physical data for anomalies, which physical data are predictable given predetermined information, the system comprising a predetermined information data point generator operative to compute a sequence of model data points which the physical data, given predetermined information, can be expected to duplicate at each of a corresponding sequence of temporal sampling points; a wayward point monitor including a processor operative for monitoring the physical data including identifying wayward points within said physical data that are incongruous with the predetermined information; and an anomalous episode-prompted alarm generator operative for identifying anomalous episodes, each including a cluster of wayward points satisfying predefined anomalous episode-defining criteria and generating an alarm for each anomalous episode identified.

27 Claims, 35 Drawing Sheets

(56) References Cited

U.S. PATENT DOCUMENTS

| | | |
|---|---|---|
| 2003/0191568 A1 | 10/2003 | Breed |
| 2005/0186933 A1 | 8/2005 | Trans |
| 2005/0192727 A1 | 9/2005 | Shostak et al. |
| 2006/0053136 A1 | 3/2006 | Ashiri |
| 2007/0276270 A1 | 11/2007 | Tran |
| 2008/0091309 A1 | 4/2008 | Walker |
| 2009/0078875 A1 | 3/2009 | Rousso et al. |
| 2009/0312998 A1 | 12/2009 | Berckmans et al. |

OTHER PUBLICATIONS

Stellingwerf, R.F., "Period Determination Using Phase Dispersion Minimization," *The Astrophysical Journal*, Sep. 15, 1978, pp. 953-960, vol. 224.

* cited by examiner

COMPUTERIZED SYSTEM FOR MONITORING AND CONTROLLING PHYSICAL DATA-PRODUCING APPARATUS

REFERENCE TO CO-PENDING APPLICATIONS

This application claims priority from Israel Patent Application No. 210358. filed 29 Dec. 2011 and entitled "Computerized System For Monitoring And Controlling Physical Data-Producing Apparatus".

FIELD OF THE INVENTION

The present invention relates generally to control systems and more particularly to feedback-providing control systems.

BACKGROUND OF THE INVENTION

Conventional technology pertaining to certain embodiments of the present invention is described in the following publications inter alia:

Power Spectrum (also known as FFT=Fast Fourier Transform) period-finding is described in Scargle, J. D., 1982, Astrophysical Journal, 263, p 835.

PDM (Phase Dispersion Minimalization) period-finding is described in Stellinwerf, R. F., 1978, Astrophysical Journal, 224, p 953.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a method for detecting anomalies in any periodic or semi-periodic data.

Certain embodiments of the present invention seek to provide a method for finding, fitting and subtracting periodic signals in order to identify and supply a real time alert on anomalous episodes.

Certain embodiments of the present invention seek to provide a method for finding one or more periodicities of data e.g. using the Power Spectrum (Fourier Transform) or the PDM (Phase Dispersion Minimalization) technique, fitting the data with this period e.g. using the least squares method, and subtracting the fit from the data to show anomalies e.g. by utilizing the standard deviation of the residual data to define or determine the significance of an anomalous data-point.

Certain embodiments of the present invention seek to provide a method for finding anomalies and supplying a suitable alert, e.g. in real time, each anomaly including a sequence of anomalous points such that the probability of randomly obtaining such an anomaly are cumulative and thus very low.

Certain embodiments of the present invention are applicable to data with multiple periodicities, multiple semi-periods or a combination of both, and to data in which the periodic variation appears less than all the time, e.g. daily between 8-10 am.

There is thus provided, in accordance with at least one aspect of the present invention, a computerized method for monitoring physical data, generated by a physical data generator, which physical data may or may not be recorded, for anomalies, the physical data being predictable subject to predetermined information characterizing the physical data generator, the method comprising using the predetermined information to compute a sequence of predicted data points which the physical data, given the predetermined information, can be expected to duplicate at each of a corresponding sequence of temporal sampling points; receiving the physical data and identifying wayward points within the physical data which are incongruous with the predetermined information; and, typically, identifying anomalous episodes each including a cluster of the wayward points satisfying predefined anomalous episode-defining criteria and using a processor to trigger a physical system action responsive to at least one anomalous episode identified.

There is thus further provided, in accordance with at least one embodiment of the present invention, a method, wherein the monitoring includes subtracting each predicted data point from a corresponding physical data point thereby to generate a sequence of residual data points.

There is thus further provided, in accordance with at least one embodiment of the present invention, a method comprising generating the predetermined information from previously physical data points.

There is thus still further provided, in accordance with at least one embodiment of the present invention, a method wherein the data are characterized by periodic variations and the periodic variations are taken into account when identifying wayward points.

There is thus further provided, in accordance with at least one embodiment of the present invention, a method comprising displaying the residual data points to a user.

There is thus further provided, in accordance with at least one embodiment of the present invention, a method wherein the periodic variations include multi-periodic variations which are taken into account when identifying wayward points.

There is thus further provided, in accordance with at least one embodiment of the present invention, a method wherein at least one period characterizing the periodic variations is found using an FFT-based method.

There is thus further provided, in accordance with at least one embodiment of the present invention, a method wherein at least one period characterizing the periodic variations is found using a phase dispersion minimalization method.

There is thus further provided, in accordance with at least one embodiment of the present invention, a method wherein the physical data comprises data generated by a satellite.

There is thus further provided, in accordance with at least one embodiment of the present invention, a method wherein the physical data comprises GPS system data.

There is thus further provided, in accordance with at least one embodiment of the present invention, a method wherein the physical data comprises north-finding system data.

There is thus still further provided, in accordance with at least one embodiment of the present invention, a method wherein the physical data comprises particle accelerator data.

There is thus still further provided, in accordance with at least one embodiment of the present invention, a method wherein the physical data comprises cardiac data.

There is thus still further provided, in accordance with at least one embodiment of the present invention, a method wherein the physical data comprises brain activity (EEG) data.

There is thus still further provided, in accordance with at least one embodiment of the present invention, a method wherein the physical data comprises atomic clock data.

There is thus still further provided, in accordance with at least one embodiment of the present invention, a method wherein the physical data comprises oscillator data.

There is thus still further provided, in accordance with at least one embodiment of the present invention, a method wherein the physical data comprises pendulum data.

There is thus still further provided, in accordance with at least one embodiment of the present invention, a method wherein the physical data comprises solar energy data having periodicity depending on the sun's periodicity.

There is thus still further provided, in accordance with at least one embodiment of the present invention, a method wherein the physical data comprises temperature data.

There is thus still further provided, in accordance with at least one embodiment of the present invention, a method wherein the physical data comprises electrical equipment data.

There is thus still further provided, in accordance with at least one embodiment of the present invention, a method wherein the physical data comprises computer component data.

There is thus still further provided, in accordance with at least one aspect of the present invention, a computerized system for monitoring physical data for anomalies, which physical data are predictable given predetermined information, the system comprising: a predetermined information data point generator operative to compute a sequence of model data points which the physical data, given predetermined information, can be expected to duplicate at each of a corresponding sequence of temporal sampling points; a wayward point monitor including a processor operative for monitoring the physical data including identifying wayward points within the physical data that are incongruous with the predetermined information; and, typically, an anomalous episode-prompted alarm generator operative for identifying anomalous episodes each including a cluster of wayward points satisfying predefined anomalous episode-defining criteria and generating, for each anomalous episode identified, an alarm including, typically, the statistical significance of the anomalous episode.

There is thus still further provided, in accordance with at least one embodiment of the present invention, a method wherein the physical system action comprises computerized generation of an anomaly event alert for a human operator.

There is thus still further provided, in accordance with at least one embodiment of the present invention, a method wherein the physical system action comprises a computerized change in at least one operating parameter of equipment associated with the physical data.

There is thus still further provided, in accordance with at least one embodiment of the present invention, a method wherein the physical system action comprises computerized suspension of operation of equipment associated with the physical data, due to an anomaly alert.

There is thus still further provided, in accordance with at least one embodiment of the present invention, a method wherein the physical system action comprises a computerized initiation of a data back-up process, for data associated with the physical data.

There is thus still further provided, in accordance with at least one embodiment of the present invention, a method wherein the physical system action comprises computerized launching of an emergency procedure.

There is thus still further provided, in accordance with at least one embodiment of the present invention, a method wherein the physical system action comprises computerized initiation of re-calibration for equipment associated with the data.

There is thus still further provided, in accordance with at least one embodiment of the present invention, a method wherein the physical system action comprises computerized initiation of at least one predetermined test to diagnose reasons for anomaly.

There is thus still further provided, in accordance with at least one embodiment of the present invention, a method wherein the physical system action is generated or not generated for an individual anomalous episode depending on at least one characteristic of at least one anomalous episode found to date.

There is thus still further provided, in accordance with at least one embodiment of the present invention, a method wherein the characteristics comprises a probability of at least the individual anomalous episode occurring by chance.

There is thus still further provided, in accordance with at least one embodiment of the present invention, a method wherein the physical system action comprises computerized generation of an anomaly event alert for an external system.

There is thus still further provided, in accordance with at least one embodiment of the present invention, a method wherein the physical data comprises ambient temperature data generated by the satellite.

There is thus still further provided, in accordance with at least one embodiment of the present invention, a method comprising using the physical data generator to generate the physical data generator.

There is thus still further provided, in accordance with at least one embodiment of the present invention, a method comprising identifying as wayward points, those points within the sequence of residual data points whose divergence from zero conforms to a waywardness criterion.

There is thus still further provided, in accordance with at least one embodiment of the present invention, a method comprising identifying as wayward points, those points within the sequence of residual data points which diverge, at a level exceeding a threshold value, from the standard deviation of the residual data.

There is thus still further provided, in accordance with at least one embodiment of the present invention, a method wherein the threshold value is determined based on the number of points in the physical data.

There is thus still further provided, in accordance with at least one embodiment of the present invention, a method, wherein the physical data includes N points and wherein the monitoring includes subtracting each predicted data point from a corresponding physical data point thereby to generate a sequence of residual data points defining noise and identifying as wayward points, those points which diverge from noise by M standard deviations of the residual data, where M is higher than expected given N.

There is thus still further provided, in accordance with at least one embodiment of the present invention, a method wherein the residual data points each define a divergence from zero and wherein the waywardness criterion comprises divergence from zero, of a point within the sequence of residual data points, which is larger, by a threshold amount, than most other residual data points' divergences from zero.

There is thus still further provided, in accordance with at least one aspect of the present invention, a computer program product, comprising a computer usable medium having a computer readable program code embodied therein, the computer readable program code adapted to be executed to implement any of the methods shown and described herein.

There is thus still further provided, in accordance with at least one aspect of the present invention, a system for implementing any of the steps of any of the methods shown and described herein. According to certain embodiments, the data are visually inspected to decide which of the methods shown herein to employ, or whether to employ a suitable combination of such methods. The visual inspection may for example be employed by a human user to determine how many periods to use and whether there is a semi-period, or perhaps a few, and which method to employ. Alternatively, the visual inspection step may be wholly or partially automated.

According to certain embodiments, once the number of periods is determined, the fit is effected simultaneously: The raw data are fitted with n periods simultaneously so as to obtain the best fit. Typically, the method does not, therefore, say, fit p1, subtract it, and fit p2 to the residual data, but instead, the method typically includes finding p1, initially subtracting it from the residual data so as to conclude that there is also p2, and then simultaneously fitting p1 and p2 to the raw data for a better fit. Nonetheless, in certain applications, the first, non-simultaneous, alternative may be employed.

The following terms may be construed either in accordance with any definition thereof appearing in the prior art literature or in accordance with the specification, or as follows:

n—an integer
t—time, a vector with n points, $t=t_i$, $i=1 \ldots n$
D—data, a 2-dimensional vector (2*n matrix) with n points, where the first column is time (in any units) and the second is any parameter (in any units). $D=(t_i, d_i)$, $i=1 \ldots n$
$\Pi=3.1425 \ldots$
f—frequency
w—angular frequency, $w=2\Pi f$
$w_1, w_2 \ldots$ —first, second . . . angular frequency
p—period, $p=1/f=2\Pi/w$. The period and the frequency are connected.
$n^{th}$ harmonic—$n*w$ ($1^{st}$ harmony=w, $2^{nd}$ harmony=2*w . . . )
M—computational model, $M=(t_i, m_i)$, $i=1 \ldots n$. For example, for satellite generated data, a model may include the earth's one-day rotational period as well as the earth's one-year period.
$M_1, M_{12} \ldots$ —first model (fitting one period), second model (fitting first and second periods) . . . .
$A_0$—a constant
$A_i, B_i \ldots Z_i$ ($i=1 \ldots 10$)—amplitudes
sin—trigonometric sine function
cos—trigonometric cosine function
$\Phi_i$ ($i=1 \ldots 10$)—angle phases
$\Phi_{2-5}$—(example) angle phase of fifth harmonic of second frequency
C—a constant
R—the residual data—raw data minus the model, $R=D-M=(t_i, d_i-m_i)$, $i=1 \ldots n$
Multi-periodic: data which have several periods
Semi-period—a periodical element or component in varying data which is not purely periodic.

Examples 1. data are periodic only during certain times (i.e. only between 2-4 pm) e.g. as shown in FIGS. 20-24
2. data are periodic, but period varies over time, e.g. as in some electrocardiograms
3. data are periodic, but amplitude within each period varies systematically over time, e.g. as in some electrocardiograms
4. data are periodic, but phase within each period varies systematically over time, e.g. as in some electrocardiograms
5. irregular data with some periodic characteristics.
6. Various combinations of examples 1-5.

Semi-frequency: inverse of the period parameter of a semi-period (1/period)

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and for memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" and the term "computerized" should be broadly construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices or devices with an embedded processor.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

DETAILED DESCRIPTION OF CERTAIN EMBODIMENTS

Figure 1:
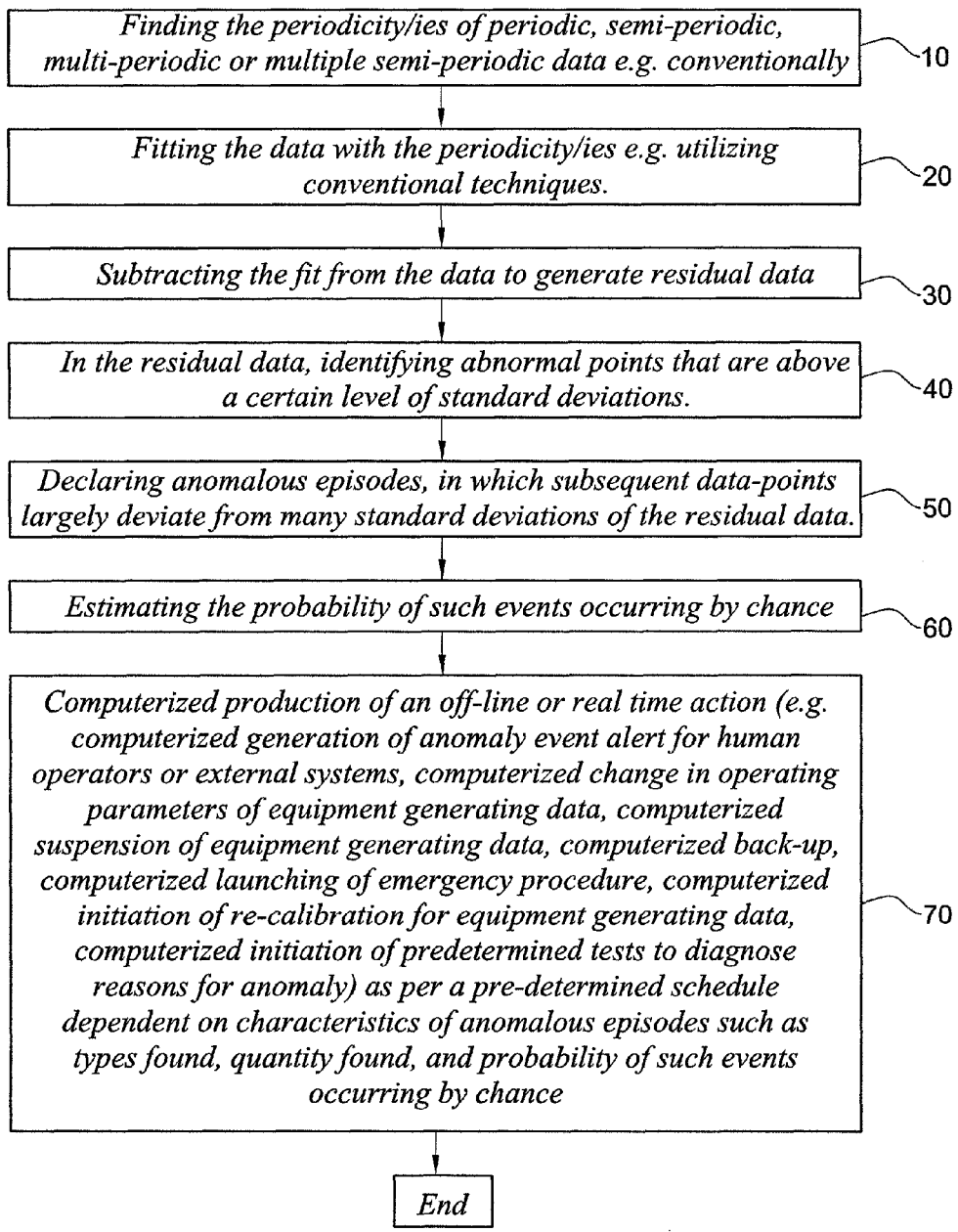
FIG. 1 is a simplified flowchart illustration of a method for computerized monitoring of a system to be monitored, using data with at least one periodic component, all in accordance with certain embodiments of the present invention.

Reference is now made to FIG. 1 which is a simplified flowchart illustration of a method for computerized monitoring of a system to be monitored, using data with at least one periodic component, all in accordance with certain embodiments of the present invention.

The method of FIG. 1 typically comprises some or all of the following steps, suitably ordered e.g. as shown:

Step 10: Finding the periodicity/ies of periodic, semi-periodic, multi-periodic, multiple semi-periodic or multi-periodic and multiple semi-periodic data e.g. conventionally Step 20: Fitting the data with the periodicity/ies and/or semi-periodicity/ies e.g. utilizing conventional data fitting techniques Step 30: Subtracting the fit from the data to generate residual data Step 40: In the residual data, identifying abnormal points that are above a certain level of standard deviations.

Step 50: Declaring anomalous episodes, in which subsequent data-points largely deviate from many standard deviations of the residual data.

Step 60: Estimating the probability of such events occurring by chance

Step 70: Computerized production of an off-line or real time action (e.g. computerized generation of anomaly event alert for human operators or external systems, computerized change in operating parameters of equipment generating data, computer-initiated pause in equipment operation, computerized back-up, computerized launching of emergency procedure, computerized initiation of re-calibration for equipment generating data including automatic control equipment associated therewith, computerized initiation of predetermined tests to diagnose reasons for anomaly, computerized progress to a subsequent stage in a multi-stage procedure) as per a pre-determined schedule dependent on characteristics of anomalous episodes such as types found, quantity found, and probability of such events occurring by chance.

The physical operation/s performed in step 70 are application specific and depend on the physical apparatus generating the data; it is appreciated that the data may for example include satellite data, GPS system data, north-finding system data (an example of a North finding system is described in U.S. Pat. No. 5,060,392); particle accelerator data, cardiac data, brain data (EEG), atomic clock data; oscillator data; pendulum data; solar energy data having periodicity depending on the sun's periodicity; temperature data; electrical equipment data; computer component data.

Regarding generation of an actual alert e.g. alarm, the alert may be accompanied by an indication of its statistical significance. Similarly, decisions re operations to be initiated may be made in advance based inter alia on statistical significance. For example, if there is a problem with the temperature (say, 5 degrees too hot), with a significance level of 99.9999%, then shut down operation of satellite.

Alert characteristics may indicate the significance e.g. an alarm that beeps louder when significance is higher.

Figure 2:
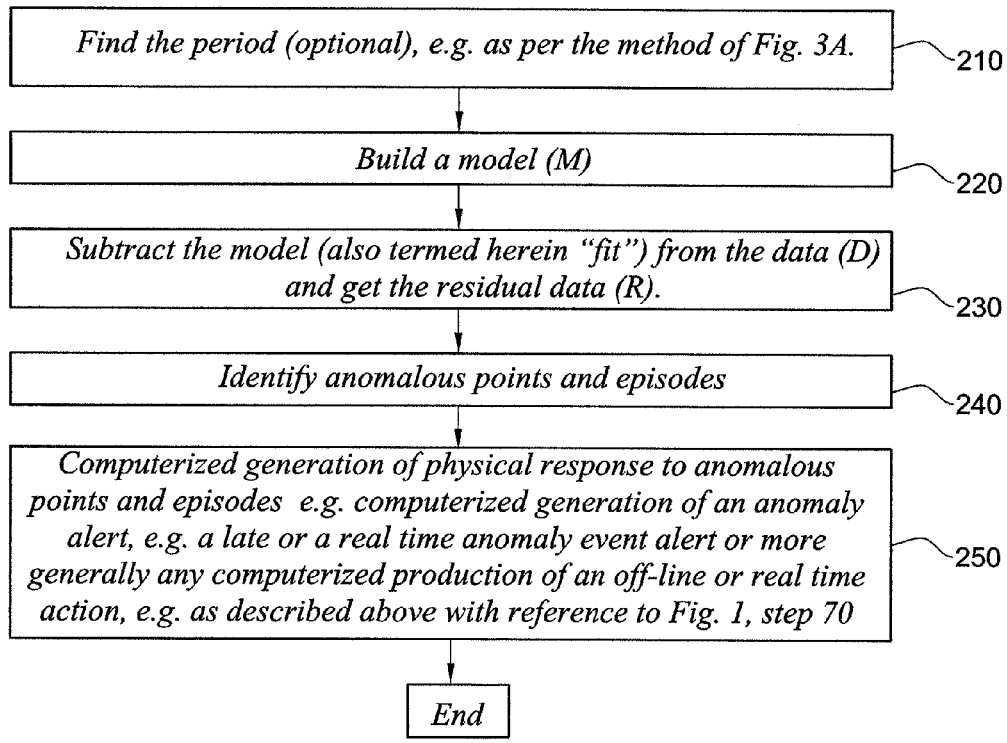
FIG. 2 is a simplified flowchart illustration of a method for computerized monitoring of a system to be monitored, using data having a single period generated by the system, all in accordance with certain embodiments of the present invention.

FIG. 2 is a simplified flowchart illustration of a method for identifying anomalies in data having a single period. FIG. 2: (FIGS. 11A, 12-13, 14-19). The model employed may be:

$$M = A_0 + A_1 * \sin(1wt + \Phi_1) + A_2 * \sin(2wt + \Phi_2) + \ldots + A_{10} * \sin(10wt + \Phi_{10}).$$

The method of FIG. 2 typically comprises some or all of the following steps, suitably ordered e.g. as shown: Step 210. Find the period (optional), e.g. as per the method of FIG. 3A. For a stable period, this preliminary step may be manually done once, although it can also be performed automatically. It is noted that usually the periodic nature of the data is known in advance, i.e. a 1-day period caused by the rotation of the Earth, or a 90-minutes satellite period etc. If the period is known and stable then this step can be omitted.

Step 220: Build a model (M)

Step 230: Subtract the model (also termed herein "fit") from the data (D) and get the residual data (R). The time input is kept intact, and the residual data are the differences between the raw data points and the model at same time dots. $R = D - M = (t_i, i = 1 \ldots n$ Step 240: Identify anomalous points and episodes Step 250: computerized generation of physical response to anomalous points and episodes e.g. computerized generation of an anomaly alert, e.g. a late or a real time anomaly event alert. The statistical threshold for an alert can be set in advance according to application-specific requirements. For example, a client may request more alerts, say anything that is higher than 95% significance, in which case 1 out of 20 cases will beep on average. Or, the client may request less alerts, say anything above 99.9999% significance in which case 1 out of 1 million cases will beep on average. The model that fits existing data can clearly be extrapolated in time and yield predictions for future data and thus supply real time alerts.

Figure 3A:
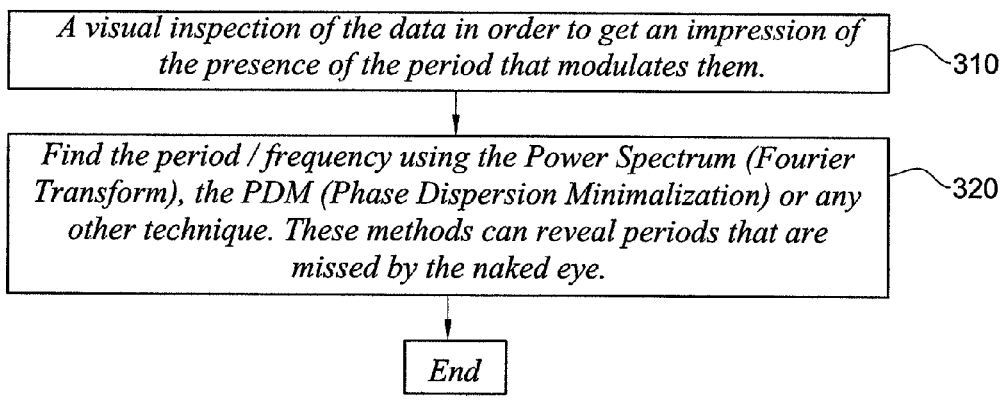
FIG. 3A is a simplified flowchart illustration of a method for performing step 210 in the method of FIG. 2, in accordance with certain embodiments of the present invention.

FIG. 3A is a simplified flowchart illustration of a method for performing step 210 in the method of FIG. 2, in accordance with certain embodiments of the present invention. The method of FIG. 3 typically comprises some or all of the following steps, suitably ordered e.g. as shown:

Step 310: A visual inspection of the data in order to get an impression of the presence of the period that modulates them. For example, FIG. 11A or FIG. 14, top panel, may be employed to perform this step. To take another example, visual inspection of the graph of FIG. 22 may yield that in addition to a 1-d period may be known to exist, there is a shorter period, of perhaps ~0.05 day that appears only between phases ~0.25-~0.75 (rough estimate by eye) of the 1-day cycle.

Figure 15:
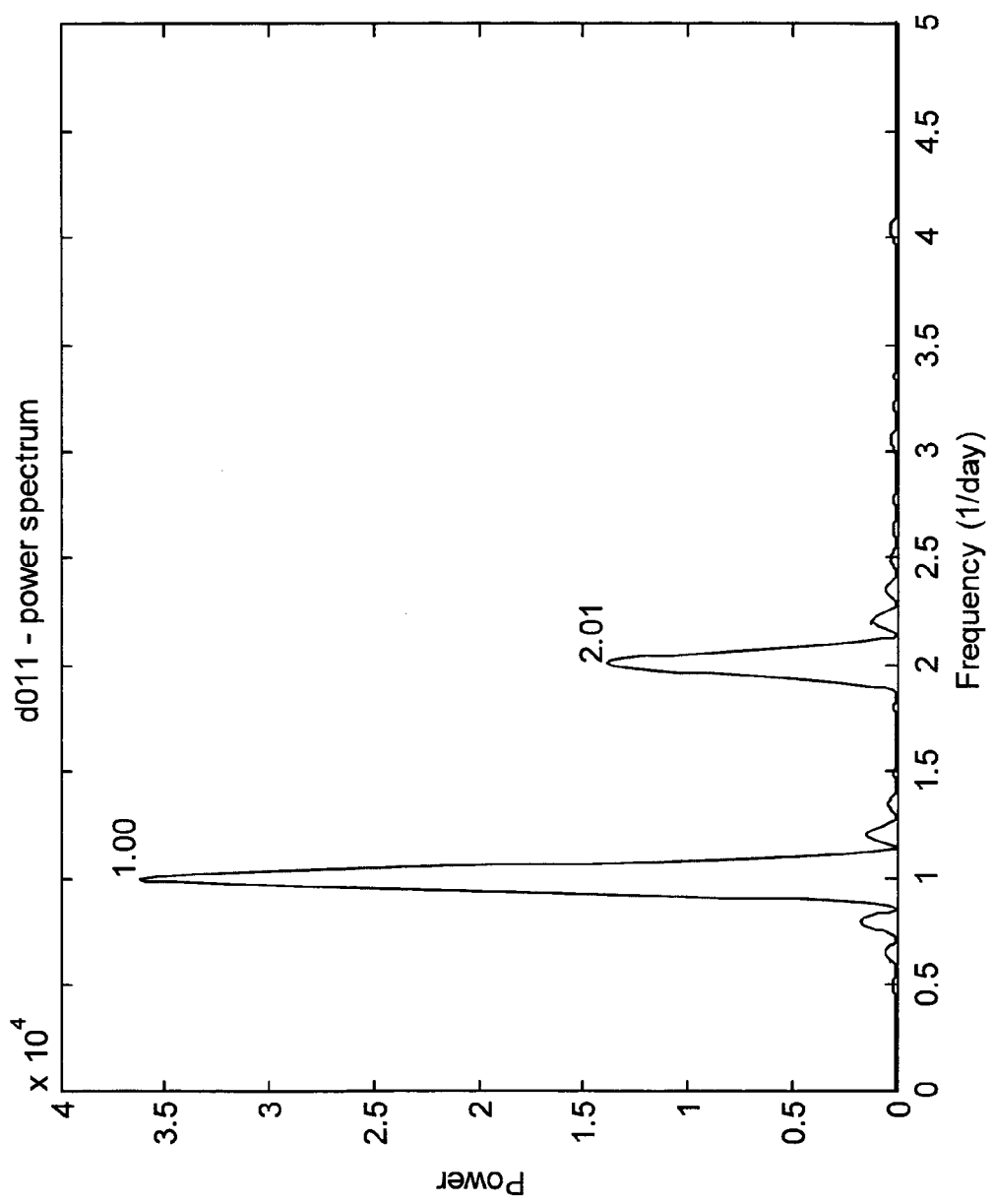

Step 320: Find the period/frequency using the Power Spectrum (Fourier Transform), the PDM (Phase Dispersion Minimalization) or any other technique. These methods can reveal periods that are missed by the naked eye. FIG. 15 may be used for this step.

Figure 3B:
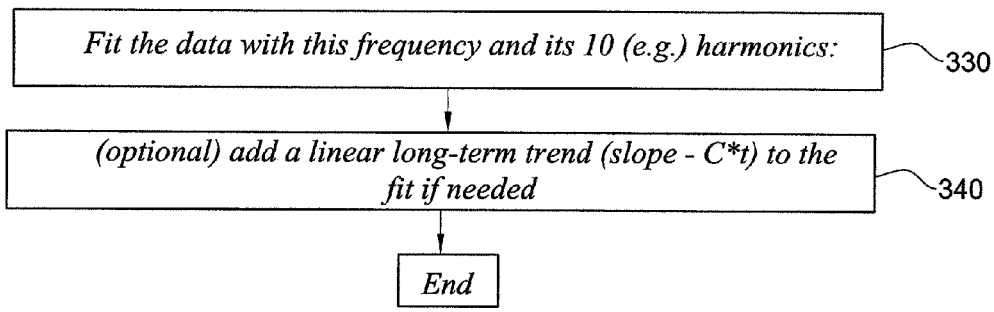
FIG. 3B is a simplified flowchart illustration of a method for performing step 220 in the method of FIG. 2, in accordance with certain embodiments of the present invention.

FIG. 3B is a simplified flowchart illustration of a method for performing step 220 in the method of FIG. 2, in accordance with certain embodiments of the present invention. The method of FIG. 3B typically comprises some or all of the following steps, suitably ordered e.g. as shown:

Step 330. Fit the data with this frequency and its 10 (e.g.) harmonics:

$$M = A_0 + A_1 * \sin(1wt + \Phi_1) + A_2 * \sin(2wt + \Phi_2) + \ldots + A_{10} * \sin(10wt + \Phi_{10})$$

The number of harmonics can be determined as per application-specific criteria e.g. reduced for variations that have a sinusoidal-like shape and for faster computing times, or increased for a better fit and sufficient computing resources. So, the number of harmonics need not be 10, this value being stipulated herein merely by way of example. Generally, the number of harmonicsit may be suitably determined e.g. as per application-specific criteria as described above, at a preliminary stage or decided automatically according to the fit e.g. by stopping as soon as adding more harmonics only slightly improves the fit. Quality of fit may for example be quantified as STD of the raw data minus the model and may be compared to a fixed pre-defined threshold value or to a predetermined ratio of the STD of the raw data e.g. 1% as described herein.

An alternative equivalent equation for the one above is using the cosine function instead of the sine function as follows:

$$M = A_0 + A_1^* \cos(1wt+\Phi_1) + A_2^* \cos(2wt+\Phi_2) + \ldots + A_{10}^* \cos(10wt+\Phi_{10})$$

or both the sine and cosine functions together, without the phases:

$$M = A_0 + A_1^* \sin(1wt) + B_1^* \cos(1wt) + \ldots + A_{10}^* \sin(10wt) + B_{10}^* \cos(10wt)$$

In addition, an alternative equivalent model can be constructed from the mean shape of the periodic variation, simply by folding the data onto the frequency. The model is then several identical cycles of this mean shape, which may change over time.

To determine the number of harmonics both initially or as per fit, the following method may be employed:
The subtraction of the fit yields the STD (standard deviation) of the residual data. Optionally, the process may be stopped once one goes below some limiting STD. For example:
0. STD of raw data=1.5 (in some units)
1. STD of residual data after the subtraction of 1 harmonic=0.2
2. STD of residual data after the subtraction of 2 harmonics=0.1
. . .
9. STD of residual data after the subtraction of 9 harmonics=0.024
10. STD of residual data after the subtraction of 10 harmonics=0.01
Example, with reference to FIGS. 12 and 13: The difference between stages 9 and 10 (0.024−0.01=0.014) is less than 1% of that in stage 0 (STD of raw data=1.5), which is a predetermined limit or stopping criterion. So, the method terminates, using only 9 harmonics.

Figure 14:
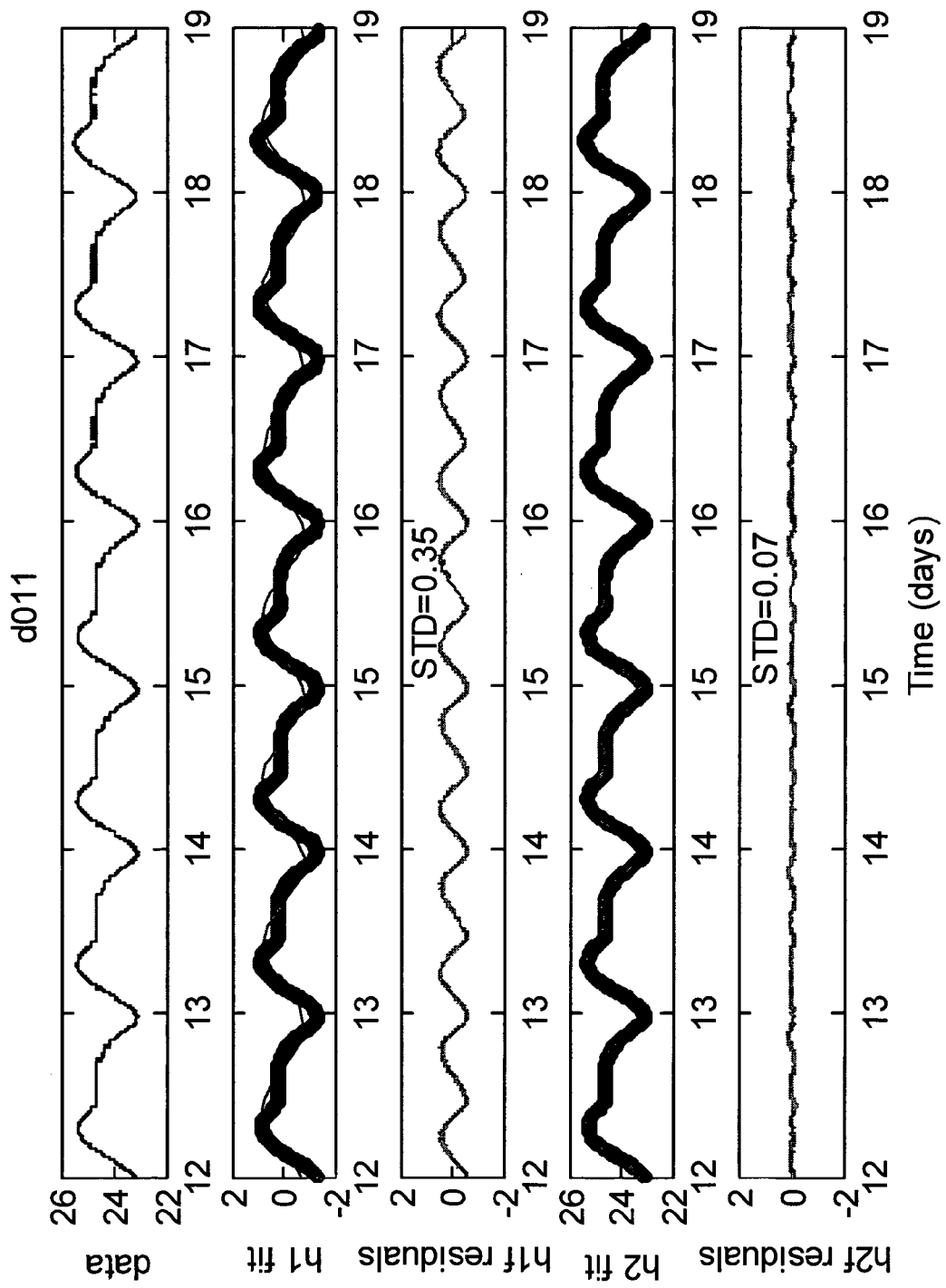

FIG. 14 (other than top panel) and 16 are relevant to this method of finding a suitable number of harmonics.

Step 340. (optional) add a linear long-term trend (slope–C*t) to the fit if needed (not needed in the illustrated examples of FIGS. 12-13 and 16, needed, for certain applications, in the illustrated example of FIGS. 17-18), e.g.:

$$M = A_0 + C^*t + A_1^* \sin(1wt+\Phi_1) + A_2^* \sin(2wt+\Phi_2) + \ldots + A_{10}^* \sin(10wt+\Phi_{10})$$

A criterion for the presence of a linear trend can be determined in advance—i.e. use a trend only if the slope constant is larger that $0.001^*A_1$. Alternatively, the decision can be manually made by a visual inspection of the data at step 1. It is noted that the linear fit and the fit of the frequency and its harmonic can be separately done (i.e. subtracting first the linear trend and then fitting the residual data with the period), but a better fit would be achieved when the two are combined in a single fit.

To find the slope coefficient, conventional tools may be employed e.g. MATLAB's polyfit function which fits a linear trend (aX+b) and yields data constants 'a' & 'b'.

Figure 3C:
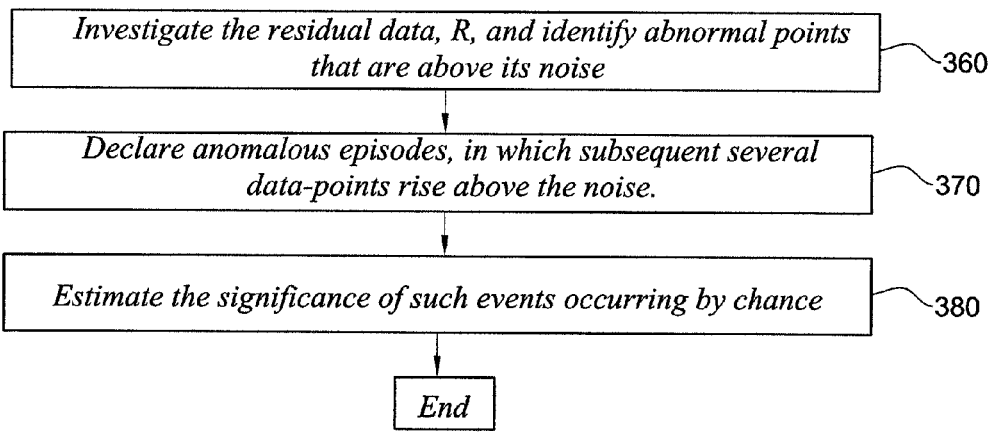
FIG. 3C is a simplified flowchart illustration of a method for performing step 240 in the method of FIG. 2, in accordance with certain embodiments of the present invention.

FIG. 3C is a simplified flowchart illustration of a method for performing step 240 in the method of FIG. 2, in accordance with certain embodiments of the present invention. The method of FIG. 3C typically comprises some or all of the following steps, suitably ordered e.g. as shown:

Step 360. Investigate the residual data, R, and identify abnormal points that are above its noise at a certain level of standard deviations (6) according to the normal (Gaussian) distribution. The threshold can be manually defined in advance or determined with a correlation to the number of data points to yield true alarms according to the normal distribution. In example, for 100 data points—the threshold can be set at about 2.2σ, for 1000 data points ~2.7σ or 3σ and for 1 million points—~3.7σ or 4σ, etc.

Step 370. Declare anomalous episodes, in which subsequent several data-points rise above the noise. The minimum number of points in an event can be manually defined in advance, in example as 1, 2, 10, n/100 etc. according to the data quality and client need.

Step 380. Estimate the significance of such events occurring by chance using simple statistics: a multiplication of significance of every single point divided by random points order (factorial of number of abnormal subsequent points). For example, if there are 100 points in the data and 2 abnormal adjacent points have significance occurring by chance as 0.01 & 0.02 then the significance of the two points anomaly event is 1−0.01*0.02/2!=0.9999 or 99.99%.

For example, if the significance of a certain event is 99.99%, an "episode" may be defined by receiving an application-specific e.g. user-selected significance threshold and selecting a suitable number of points to "fit" that significance. The higher the requested significance, the less points/episodes/alerts are generated. In 100,000 points, 99.999% significance means a single point on average, whereas 99.5% means 500 points on average.

Figure 4A:
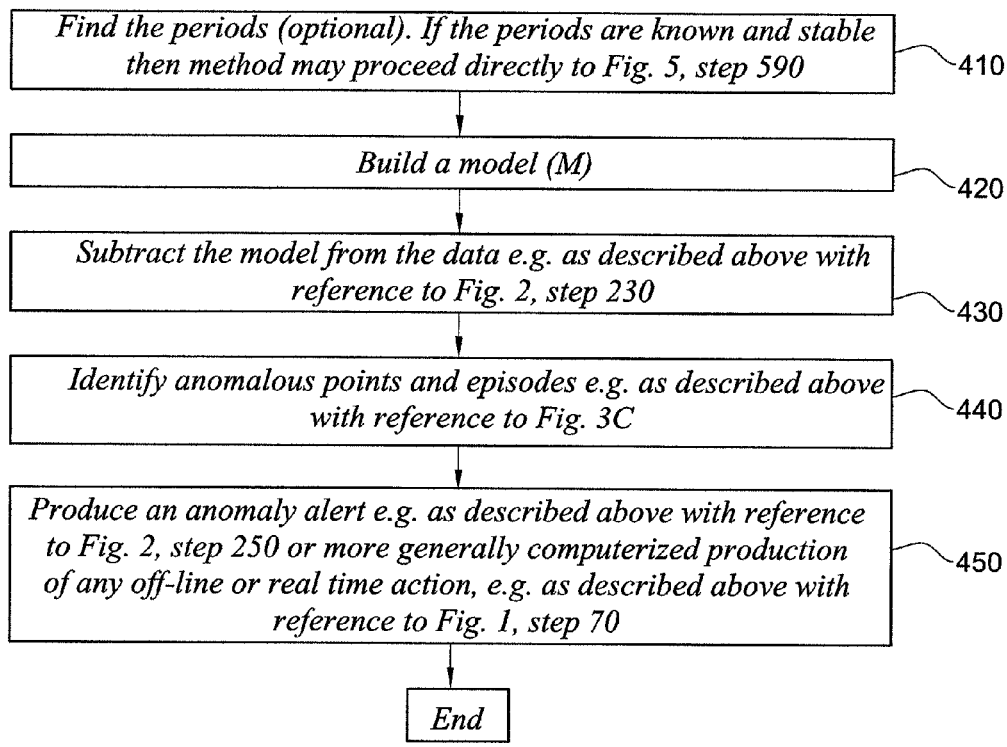
FIG. 4A is a simplified flowchart illustration of a method for computerized monitoring of a system to be monitored, using multi-periodic data generated by the system, in accordance with certain embodiments of the present invention.

FIG. 4A is a simplified flowchart illustration of a method for computerized monitoring of a system to be monitored, using multi-periodic data generated by the system, in accordance with certain embodiments of the present invention. The method of FIG. 4A typically comprises some or all of the following steps, suitably ordered e.g. as shown:
4A: multi-periodic (FIGS. 29-34). The model employed may be:

$$M_{12} = A_0 + C^*t + A_1^* \sin(1w_1t + \Phi_{1\text{-}1}) + A_2^* \sin(2w_1t + \Phi_{1\text{-}2}) + \ldots + A_{10}^* \sin(10w_1t + \Phi_{1\text{-}10}) + B_1^* \sin(1w_2t + \Phi_{2\text{-}1}) + B_2^* \sin(2w_2t + \Phi_{2\text{-}2}) + \ldots + B_{10}^* \sin(10w_2t + \Phi_{2\text{-}10}).$$

Step 410: Find the periods (optional). For stable periods, i.e. periods which do not change over time, this preliminary step should be best manually done once, although it can also be performed automatically by fixing the maximum number of periods allowed for the model. It is noted that usually the periodic or multi-periodic nature of the data is known in advance, i.e. a 1-day period caused by the rotation of the Earth, a 90-minutes satellite period, a combination of both etc. If the periods are known and stable then method may proceed directly to step 590

Step 420: Build the model (M)
Step 430: Subtract the model from the data e.g. as described above with reference to FIG. 2, step 230
Step 440: Identify anomalous points and episodes e.g. as described above with reference to FIG. 3C
Step 450: Produce an anomaly alert e.g. as described above with reference to FIG. 2, step 250

Figure 4B:
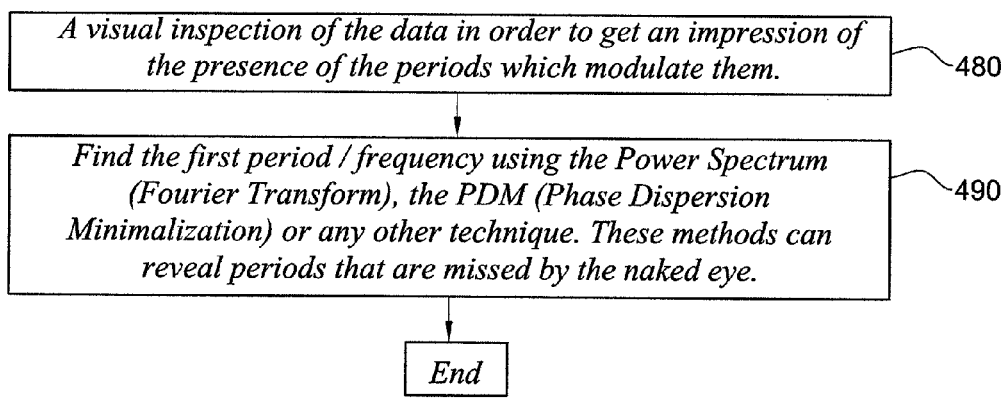
FIG. 4B is a simplified flowchart illustration of a method for performing step 410 in the method of FIG. 4A, in accordance with certain embodiments of the present invention.

FIG. 4B is a simplified flowchart illustration of a method for performing step 410 in the method of FIG. 4A, in accordance with certain embodiments of the present invention. The method of FIG. 4B typically comprises some or all of the following steps, suitably ordered e.g. as shown:

Step 480. A visual inspection of the data in order to get an impression of the presence of the periods that modulate them.
Step 490. Find the first period/frequency using the Power Spectrum (Fourier Transform), the PDM (Phase Dispersion Minimalization) or any other technique. These methods can reveal periods that are missed by the naked eye.

It is appreciated that the simplified flowchart illustrations are only exemplary of possible methods. For example, steps 480 and 490 may include, if desired, checking whether more than one e.g. several periods are present, and if so, skipping appropriate steps in FIG. 4A.

Example 3 periods are identified by initial visual inspection of the data (human vision, computer vision). In this case, it is unnecessary and typically less advantageous, to find the first period (using the power spectrum), subtract it, re-run the power spectrum on the residuals, find the second period, find the fit of the two periods on the raw data, subtract this fit from the raw data, and re-run time the power spectrum on the new residual data (after the subtraction of the 2-periods fit), find the third period and find the 3-period fit to the raw data. Instead, the power spectrum may simply be run on the raw data and all 3 periods found at this stage, and then the 3-period fit to the raw data may be found.

Figure 5:
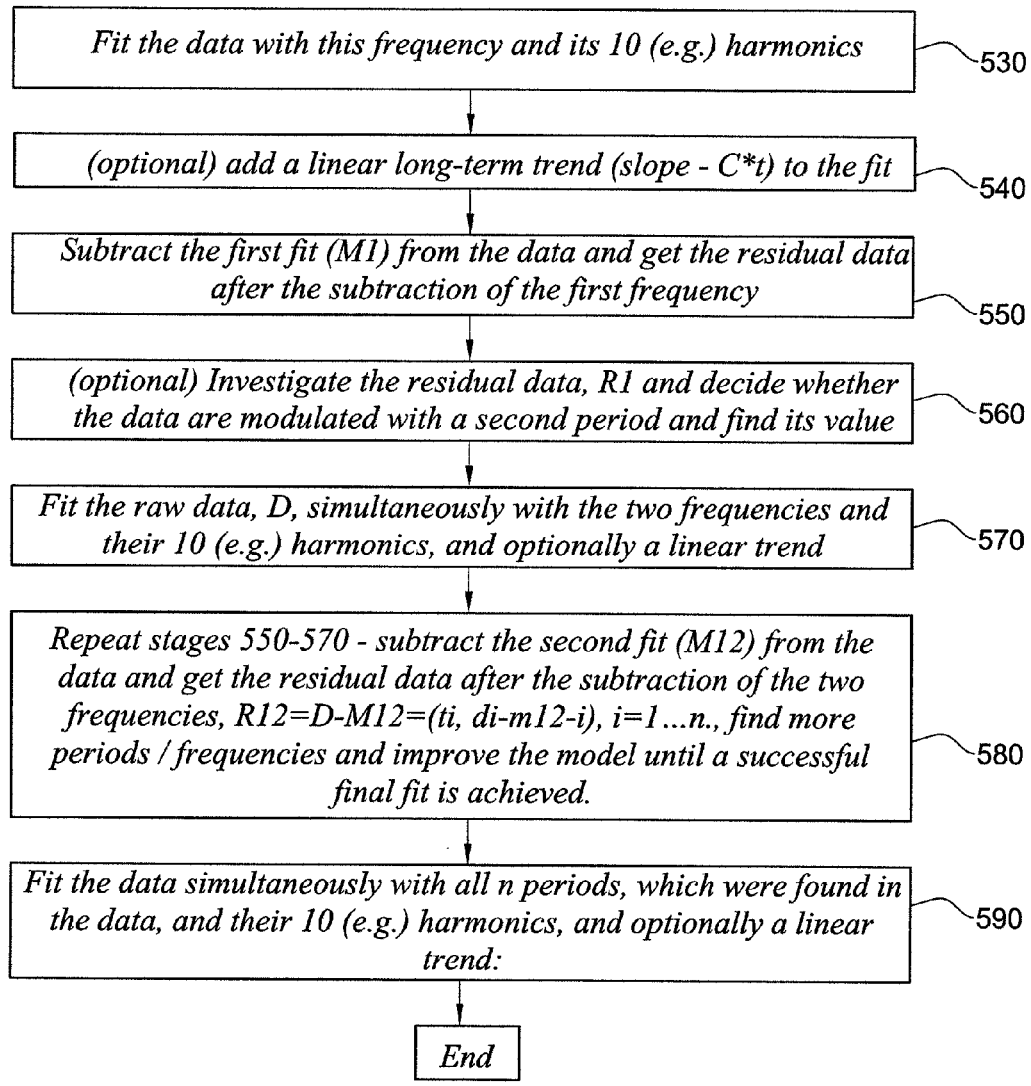
FIG. 5 is a simplified flowchart illustration of a method for performing step 420 in the method of FIG. 4A, in accordance with certain embodiments of the present invention.

FIG. 5 is a simplified flowchart illustration of a method for performing step 420 in the method of FIG. 4A, in accordance with certain embodiments of the present invention. The method of FIG. 5 typically comprises some or all of the following steps, suitably ordered e.g. as shown:

Step 530. Fit the data with this frequency and its 10 harmonics:

$$M_1 = A_0 + A_1 * \sin(1w_1 t + \Phi_1) + A_2 * \sin(2w_1 t + \Phi_2) + \ldots + A_{10} * \sin(10w_1 t + \Phi_{10})$$

The number of harmonics can be reduced for variations that have a sinusoidal-like shape and for faster computing times, or increased for a better fit and sufficient computing resources. The optimal number of harmonics can be determined at a preliminary stage or decided automatically according to the fit—simply stop once adding more harmonics only slightly improves the fit.

Note that an alternative equivalent equation for the one above is using instead the cosine function:

$$M_1 = A_0 + A_1 * \cos(1w_1 t + \Phi_1) + A_2 * \cos(2w_1 t + \Phi_2) + \ldots + A_{10} * \cos(10w_1 t + \Phi_{10})$$

or both the sine and cosine functions together, without the phases:

$$M_1 = A_0 + A_1 * \sin(1w_1 t) + B_1 * \cos(1w_1 t) + \ldots + A_{10} * \sin(10w_1 t) + A_{10} * \cos(10w_1 t)$$

Also, an alternative equivalent model can be constructed from the mean shape of the periodic variation, simply by folding the data onto the frequency. The model is then several identical cycles of this mean shape, which may change over time.

Step 540. (optional) add a linear long-term trend (slope–C*t) to the fit if needed:

$$M_1 = A_0 + C^* t + A_1 * \sin(1w_1 t + \Phi_1) + A_2 * \sin(2w_1 t + \Phi_2) + \ldots + A_{10} * \sin(10w_1 t + \Phi_{10})$$

A criterion for the presence of a linear trend can be determined in advance—i.e. use a trend only if the slope constant is larger that $0.001 * A_1$. Alternatively, the decision can be manually made by a visual inspection of the data at step 1. It is noted that the linear fit and the fit of the frequency and its harmonic can be separately done (i.e. subtracting first the linear trend and then fitting the residual data with the period), but a better fit would be achieved when the two are combined in a single fit.

Step 550. Subtract the first fit ($M_1$) from the data and get the residual data after subtraction of the first frequency, $R_1 = D - M_1 = (t_i, d_i - m_{1-i})$, $i = 1 \ldots n$. The time input is kept intact, and the residual data are the differences between the raw data points and the first model at same time dots.

Step 560. (optional) Investigate the residual data, $R_1$ and decide whether the data are modulated with a second period and find its value. This can be done by a visual inspection and by performing the methods listed in step 2 above, but this time on the residual data, $R_1$, rather than the raw data, D.

Step 570. Fit the raw data, D, simultaneously with the two frequencies and their 10 harmonics, and optionally a linear trend:

$$M_{12} = A_0 + C^* t + A_1^* \sin(1w_1 t + \Phi_{1-1}) + A_2^* \sin(2w_1 t + \Phi_{1-2}) + \ldots + A_{10}^* \sin(10w_1 t + \Phi_{1-10}) + + B_1^* \sin(1w_2 t + \Phi_{2-1}) + B_2^* \sin(2w_2 t + \Phi_{2-2}) + \ldots + B_{10}^* \sin(10w_2 t + \Phi_{2-10}) +$$

Comment: the best fit is done simultaneously.

Step 580. Repeat stages 550-570—subtract the second fit ($M_{12}$) from the data and get the residual data after the subtraction of the two frequencies, $R_{12} = D - M_{12} = (t_i, d_i - m_{12-i})$, $i = 1 \ldots n$, find more periods/frequencies and improve the model until a successful final fit is achieved. For automatic procedures a decision for the maximum number of periods allowed should be made in advance or alternatively, a successful fit should be defined according to the standard deviation of the residual data, or to the ratio between the standard deviation of the residual data and the standard deviation of the raw data.

Step 590. Fit the data simultaneously with all n periods, which were found in the data, and their 10 harmonics, and optionally a linear trend:

$$M_{12 \ldots n} = A_0 + C^* t + A_1^* \sin(1w_1 t + \Phi_{1-1}) + A_2^* \sin(2w_1 t + \Phi_{1-2}) + \ldots + A_{10}^* \sin(10w_1 t + \Phi_{1-10}) + + B_1^* \sin(1w_2 t + \Phi_{2-1}) + B_2^* \sin(2w_2 t + \Phi_{2-2}) + \ldots + B_{10}^* \sin(10w_2 t + \Phi_{2-10}) + \ldots + Z_1^* \sin(1w_n t + \Phi_{n-1}) + Z_2^* \sin(2w_n t + \Phi_{n-2}) + \ldots + Z_{10}^* \sin(10w_n t + \Phi_{n-10})$$

Where the first three terms written out above are the first, second and tenth harmonics for a first period, the second three terms written out above are the first, second and tenth harmonics for a second period, and last three terms written out above are the first, second and tenth harmonics for an n'th period.

Figure 6:
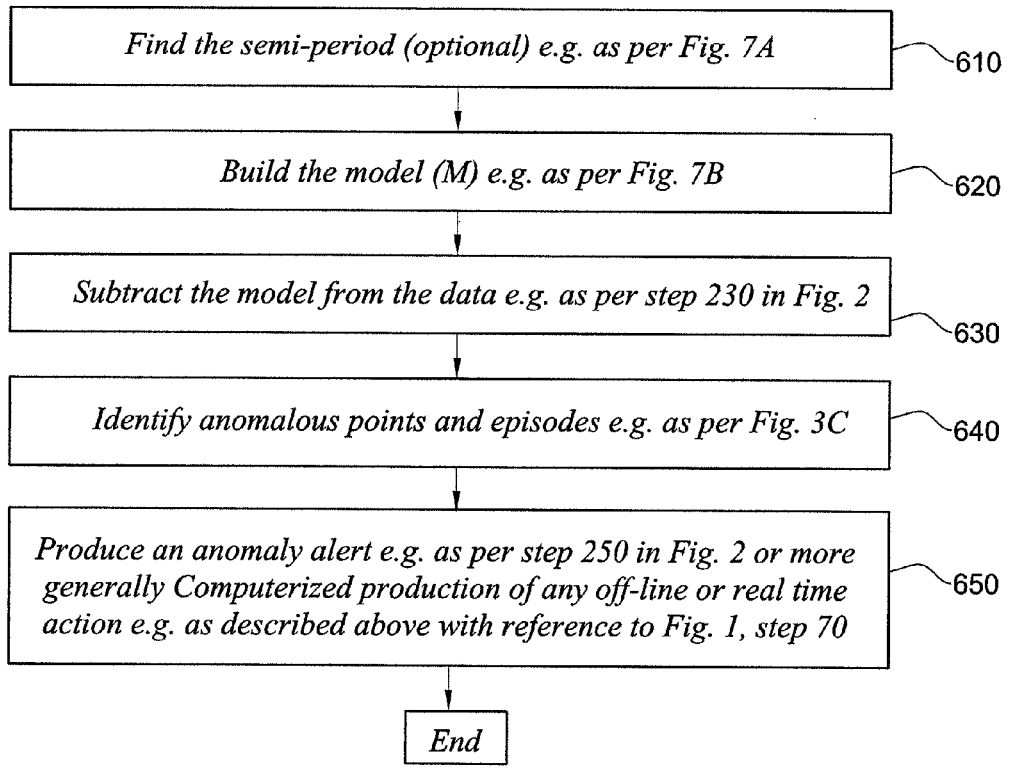
FIG. 6 is a simplified flowchart illustration of a method for computerized monitoring of a system to be monitored, using semi-periodic data generated by the system, in accordance with certain embodiments of the present invention.

FIG. 6 is a simplified flowchart illustration of a method for computerized monitoring of a system to be monitored, using semi-periodic data generated by the system, e.g. as described below with reference to FIGS. 20-24, in accordance with certain embodiments of the present invention. The method of FIG. 6 typically comprises some or all of the following steps, suitably ordered e.g. as shown:

Step 610: Find the semi-period (optional) e.g. as per FIG. 7A

This preliminary step should be best manually done once, although it can also be performed automatically once the nature of the semi period is known—for example if the periodic variation appears only during certain time intervals of the day.

This step and corresponding steps in other methods, can be skipped, if the semi-period value and its semi-periodic nature (type of semi-period and parameters of that type) are known. This step can be performed automatically by pre-defining a type of semi-period to be identified in a particular application. For example, it may be desired to identify a semi-period that appears only during 3 successive hours of the day.

The semi-period may be found automatically, particularly its type and parameters of its type are known in advance. For example, if the semi-period occurs only between 2-4 am, then a period search is conducted on only these data. However, a standard period search may also be fruitful even if the nature of the semi-period is unknown.

Step 620: Build the model (M) e.g. as per FIG. 7B

Step 630: Subtract the model from the data e.g. as per step 230 in FIG. 2

Step 640: Identify anomalous points and episodes e.g. as per FIG. 3C

Step 650: Produce an anomaly alert e.g. as per step 250 in FIG. 2

Figure 7A:
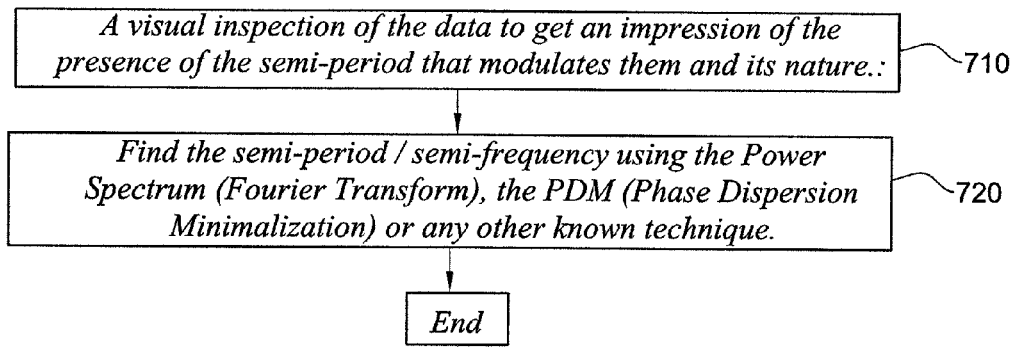
FIG. 7A is a simplified flowchart illustration of a method for performing step 610 in the method of FIG. 6, in accordance with certain embodiments of the present invention.

FIG. 7A is a simplified flowchart illustration of a method for performing step 610 in the method of FIG. 6, in accordance with certain embodiments of the present invention. The method of FIG. 7A typically comprises some or all of the following steps, suitably ordered e.g. as shown:

Step 710. A visual inspection of the data to get an impression of the presence of the semi-period that modulates them and its nature.

Step 720. Find the semi-period/semi-frequency using the Power Spectrum (Fourier Transform), the PDM (Phase Dispersion Minimalization) or any other known technique. This stage should be carefully done with an adjustment to the nature of the semi period. In example, if the periodic variation only appears between 2-4 pm, then only these data should be taken in the analysis—the search for the period. It is, however, noted that the value of the semi-period and its nature can also be automatically determined from the data using, in advance, some criteria for its nature.

Figure 7B:
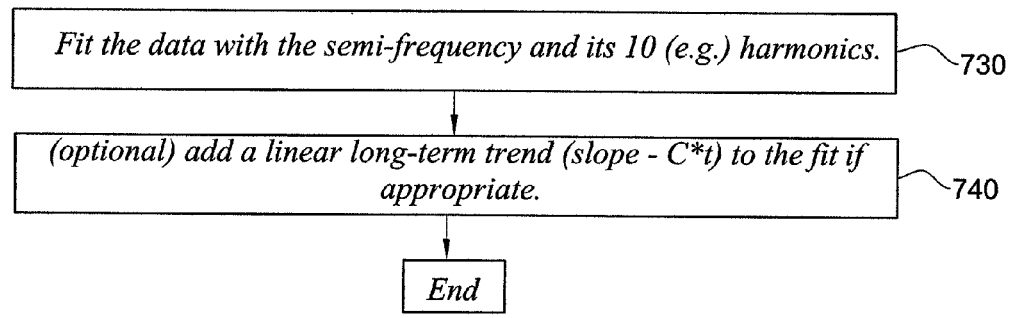
FIG. 7B is a simplified flowchart illustration of a method for performing step 620 in the method of FIG. 6, in accordance with certain embodiments of the present invention.

FIG. 7B is a simplified flowchart illustration of a method for performing step 620 in the method of FIG. 6, in accordance with certain embodiments of the present invention. The method of FIG. 7B typically comprises some or all of the following steps, suitably ordered e.g. as shown:

Step 730. Fit the data with the semi-frequency and its 10 harmonics. This step is similar to step 3 in FIG. 2, but the fit should be done according to the nature of the semi-period. In example, if the periodic variation only appears between 2-4 pm, then the fit includes a periodic variation during these hours and a constant value for the rest of the day.

Step 740. (optional) add a linear long-term trend (slope–C*t) to the fit if appropriate. A criterion for the presence of a linear trend can be also determined—i.e. use a trend only if the slope constant is larger that $0.001*A_1$. Alternatively, the decision can be manually done at step 1. It is noted that the linear fit and the fit of the semi-frequency and its harmonic can be separately done, but a better fit would be achieved when the two are combined in a single fit.

Figure 8A:
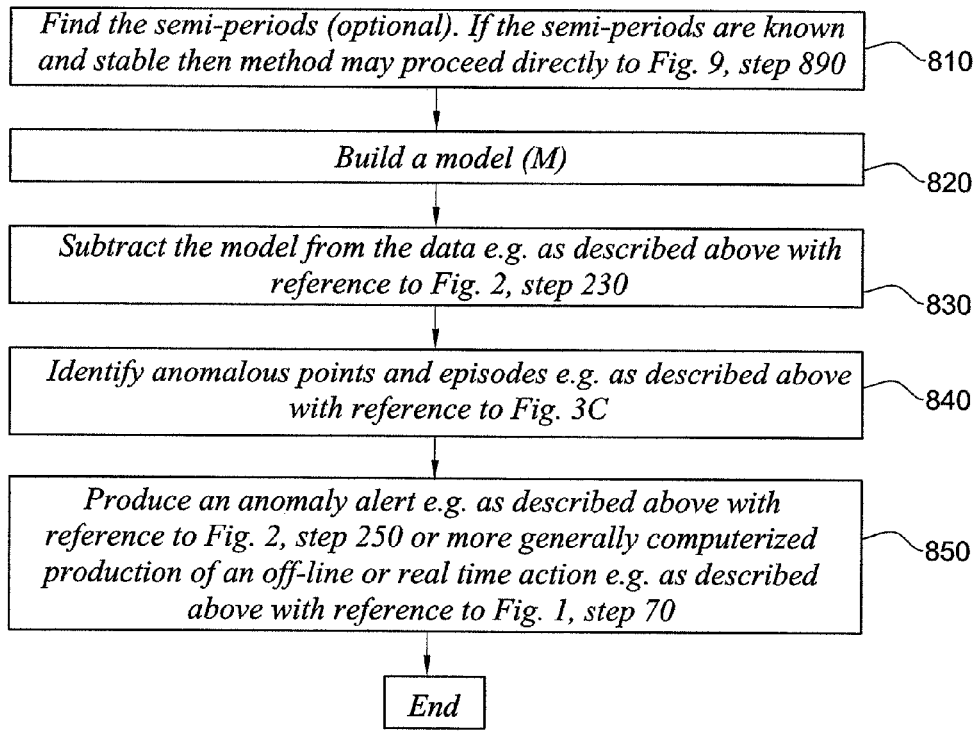
FIG. 8A is a simplified flowchart illustration of a method for computerized monitoring of a system to be monitored, using multiple semi-periodic data (e.g. data, having multiple semi-periods) generated by the system, in accordance with certain embodiments of the present invention.

FIG. 8A is a simplified flowchart illustration of a method for computerized monitoring of a system to be monitored, using multiple semi-periodic data (e.g. data, having multiple semi-periods) generated by the system, in accordance with certain embodiments of the present invention. The method of FIG. 8A typically comprises some or all of the following steps, suitably ordered e.g. as shown:

Step 810: Find the semi-periods (optional). If the semi-periods are known and stable then the method may proceed directly to FIG. 9, step 930

Step 820: Build the model (M)

Step 830: Subtract the model from the data e.g. as described above with reference to FIG. 2, step 230

Step 840: Identify anomalous points and episodes e.g. as described above with reference to FIG. 3C

Step 850: Produce an anomaly alert e.g. as described above with reference to FIG. 2, step 250

Figure 8B:
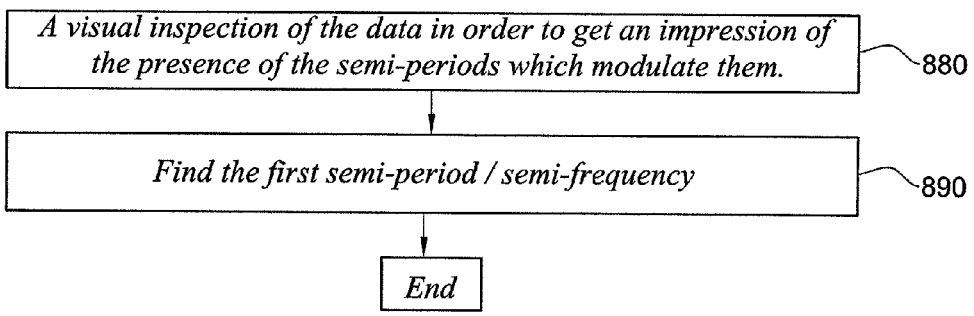
FIG. 8B is a simplified flowchart illustration of a method for performing step 810 in the method of FIG. 8A, in accordance with certain embodiments of the present invention.

FIG. 8B is a simplified flowchart illustration of a method for performing step 810 in the method of FIG. 8A, in accordance with certain embodiments of the present invention. The method of FIG. 8B typically comprises some or all of the following steps, suitably ordered e.g. as shown:

Step 880. A visual inspection of the data in order to get an impression of the presence of the semi-periods which modulate them.

Step 890. Find the first semi-period/semi-frequency

Figure 9:
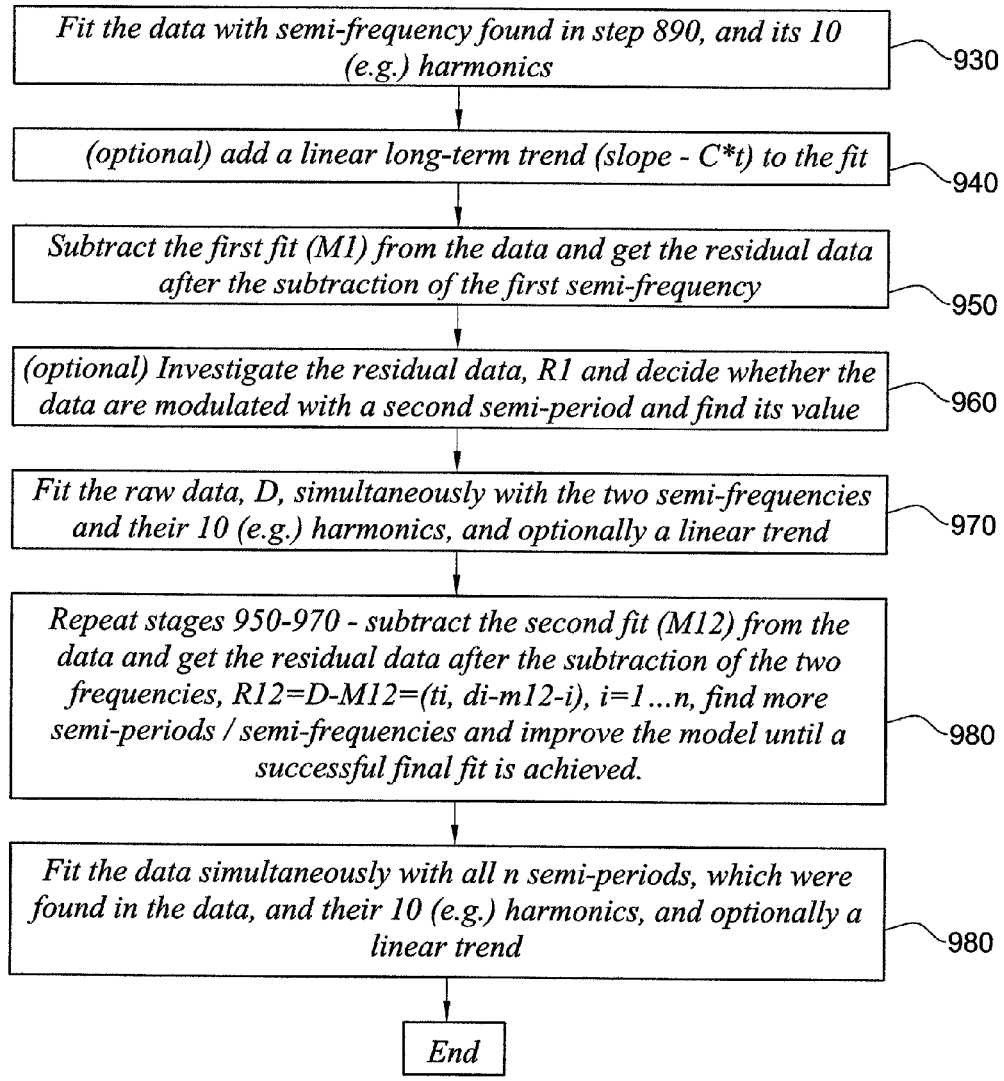
FIG. 9 is a simplified flowchart illustration of a method for performing step 820 in the method of FIG. 8A, in accordance with certain embodiments of the present invention.

FIG. 9 is a simplified flowchart illustration of a method for performing step 820 in the method of FIG. 8A, in accordance with certain embodiments of the present invention. The method of FIG. 9 typically comprises some or all of the following steps, suitably ordered e.g. as shown:

Step 930. Fit the data with the semi-frequency found in step 890, and its 10 (e.g.) harmonics Step 940. (optional) add a linear long-term trend (slope–C*t) to the fit Step 950. Subtract the first fit ($M_f$) from the data and get the residual data after the subtraction of the first semi-frequency Step 960. (optional) Investigate the residual data, $R_1$ and decide whether the data are modulated with a second semi-period and find its value Step 970. Fit the raw data, D, simultaneously with the two semi-frequencies and their 10 harmonics, and optionally a linear trend Step 980. Repeat stages 950-970—subtract the second fit ($M_{12}$) from the data and get the residual data after the subtraction of the two frequencies, $R_{12}=D-M_{12}=(t_i, d_i-m_{12-i})$, i=1 . . . n, find more semi-periods/semi-frequencies and improve the model until a successful final fit is achieved Step 990. Fit the data simultaneously with all n semi-periods, which were found in the data, and their 10 (e.g.) harmonics, and optionally a linear trend When complex data, having many periods and semi-periods, is being monitored, one-period variations are typically handled, e.g. as per the method of FIG. 2, before semi-periodic variations are handled, e.g. as per the method of FIG. 6, unless the amplitudes of the former are very small compared with the amplitudes of the latter in which case semi-periodic variations may be handled first. Typically, the final fit is done for all periods and semi-periods together.

Figure 10:
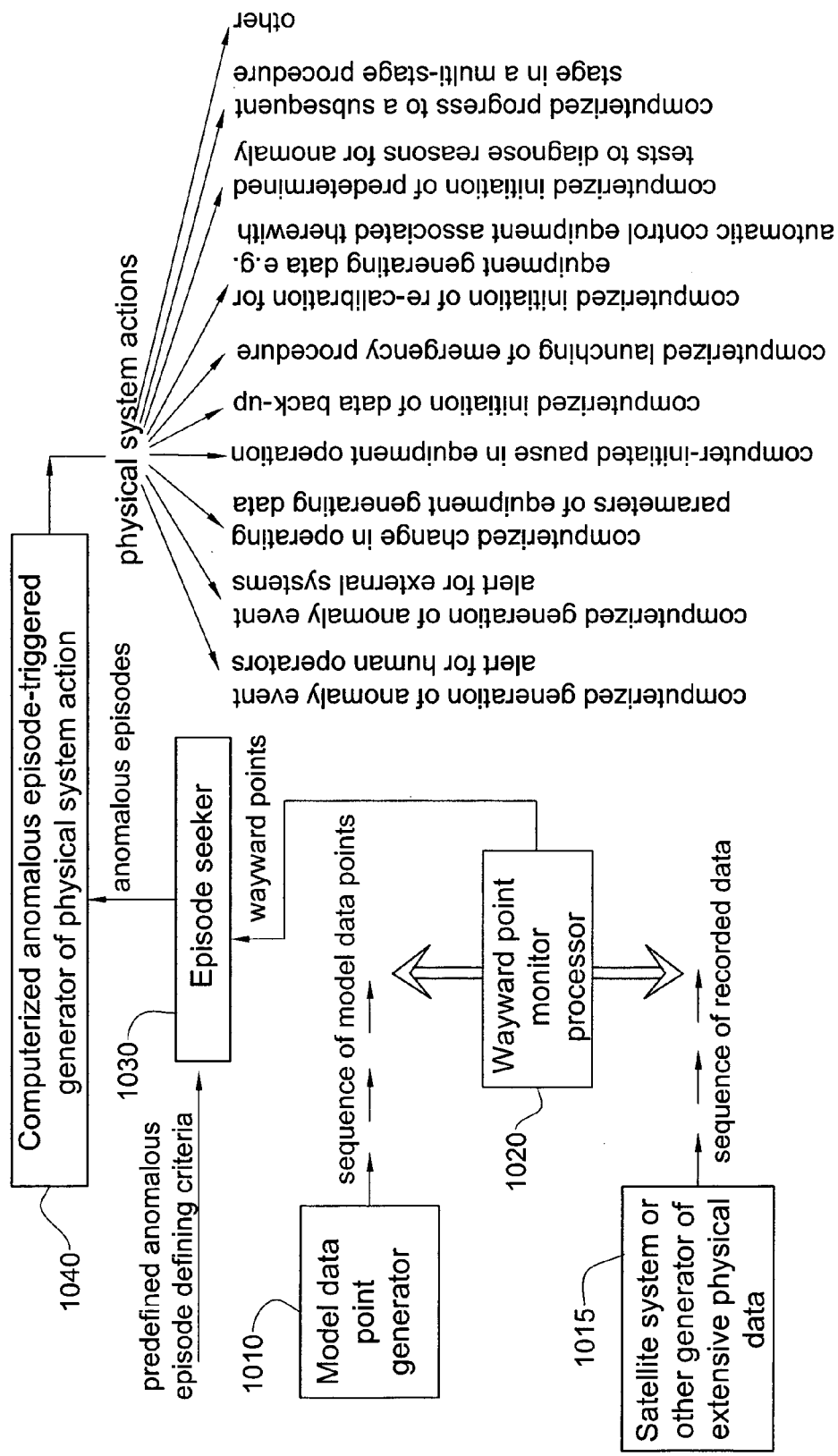
FIG. 10 is a simplified functional block diagram illustration of a computerized, data monitoring control system useful in performing certain methods shown and described herein such as the method of FIG. 1.

Reference is now made to FIG. 10 which is a simplified functional block diagram illustration of a computerized data monitor system useful in performing certain methods shown and described herein such as the method of FIG. 1. The system of FIG. 10 typically includes a Model data point generator 1010 which typically generates a sequence of predicted data points e.g., if a computational model is used for prediction, model data points. A physical data generator 1015—one possible example being a satellite—generates a corresponding sequence of physical data which typically includes a very long sequence of data which may include hundreds, millions or even hundreds of millions and more of data elements. A Wayward point monitor processor 1020 receives and processes the corresponding sequences and identifies wayward temporal locations (wayward points e.g.) at which the physical data deviates from the model data points. An episode seeker 1030 uses predefined e.g. system-defined or user-defined anomalous episode defining criteria to generate an output indication of anomalous episodes. A computerized anomalous episode-triggered generator 1040 of physical system actions generates at least one physical system action responsive to the output indication of anomalous episodes generated by episode seeker 1030.

The system action so generated may for example include one or more of the following: computerized generation of anomaly event alert for human operators; computerized generation of anomaly event alert for external systems, computerized change in operating parameters of equipment generating data, computer-initiated pause in equipment operation e.g. if episodes found are indicative of dangerous malfunction, computerized initiation of data back-up, computerized launching of emergency procedure e.g. if episodes found are indicative of danger which requires such procedures, computerized initiation of re-calibration for equipment generating data e.g. automatic control equipment associated therewith e.g. if episodes found are indicative of a need for re-calibration, computerized initiation of predetermined tests to diagnose reasons for anomaly, or computerized progress to a subsequent stage in a multi-stage procedure.

For example, if the predetermined information comprises a computational model, the wayward points may be those at which the physical data strays to more than a predetermined extent, from the model data predicted by the model.

To continue the satellite application example, which of course is only one among innumerable applications hence is not intended to be limiting, when monitoring satellite temperature, it may be desired to supply an alert for anomalies in the temperature in order to keep the devices safe or to alert a hit by an asteroid or to alert that the data around this time should be carefully examined or even rejected because it may be invalid or low quality data.

According to certain embodiments of the invention, the system of FIG. 10 may be operative to identify onset of one or more special events whose effect on the physical data is at least partly or even completely known to the system, but whose onset or onsets, are not known. For example, the system might identify onset of occurrence of at least one route modification from a library of known route modifications which are partially or entirely known other than time of onset. The system may act upon detected onsets of special events, in accordance with a pre-determined logical schedule of physical actions contingent upon data analysis for identifying special events in accordance with the methods shown and described herein, mutatis mutandis.

According to certain embodiments, at least one predicted data point, of at least one of said special events, may be subtracted from a corresponding physical data point thereby to generate a sequence of residual data points defining noise. Points which diverge from the noise by M standard deviations of the residual data, where M is higher than expected given N, may then be identified as wayward points.

It is appreciated that the system of FIG. 10 may if desired be employed to operate upon a sequence of physical data which is not periodic but nonetheless is predictable in the sense that the data exhibits a known behavior which is not periodic.

Figure 11A:
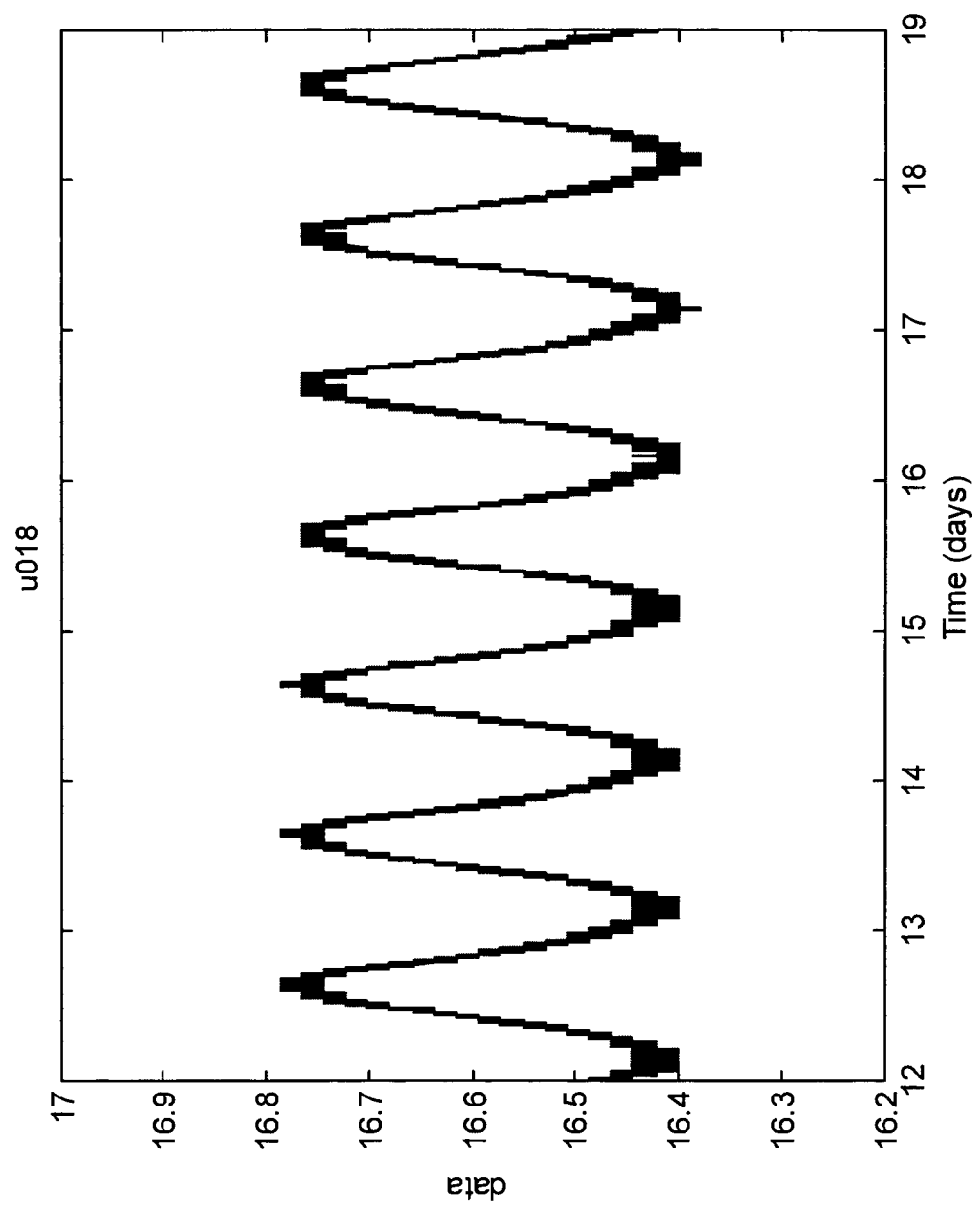
FIGS. 11A-19 are graphs illustrating an example of an application of the method of FIG. 2 to satellite data.

FIGS. 11A-19 are examples of an application of the method of FIG. 2 to satellite data. In particular:

FIG. 11A is a graph of a first stream of data vs. time which is almost completely sinusoidal.

Figure 11B:
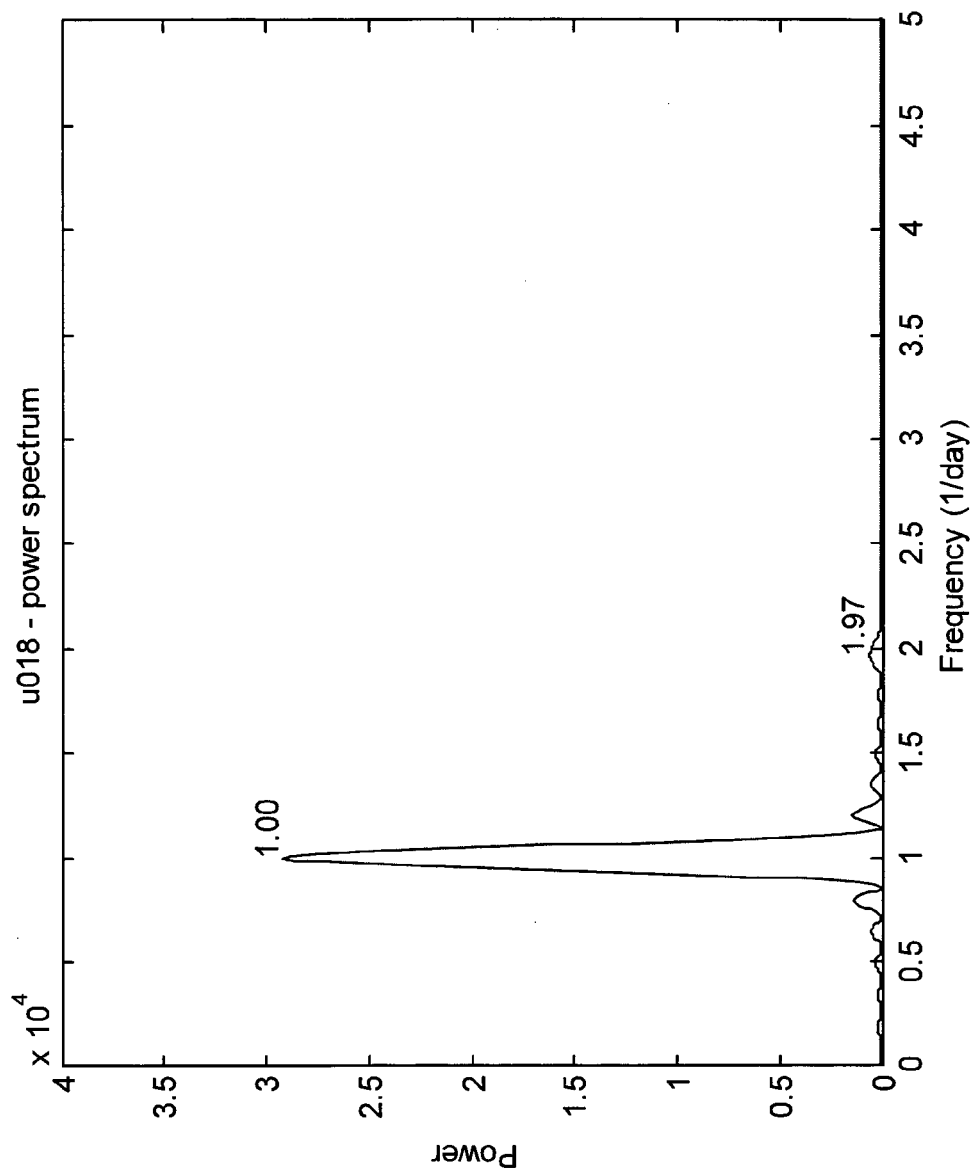
Figure 12:
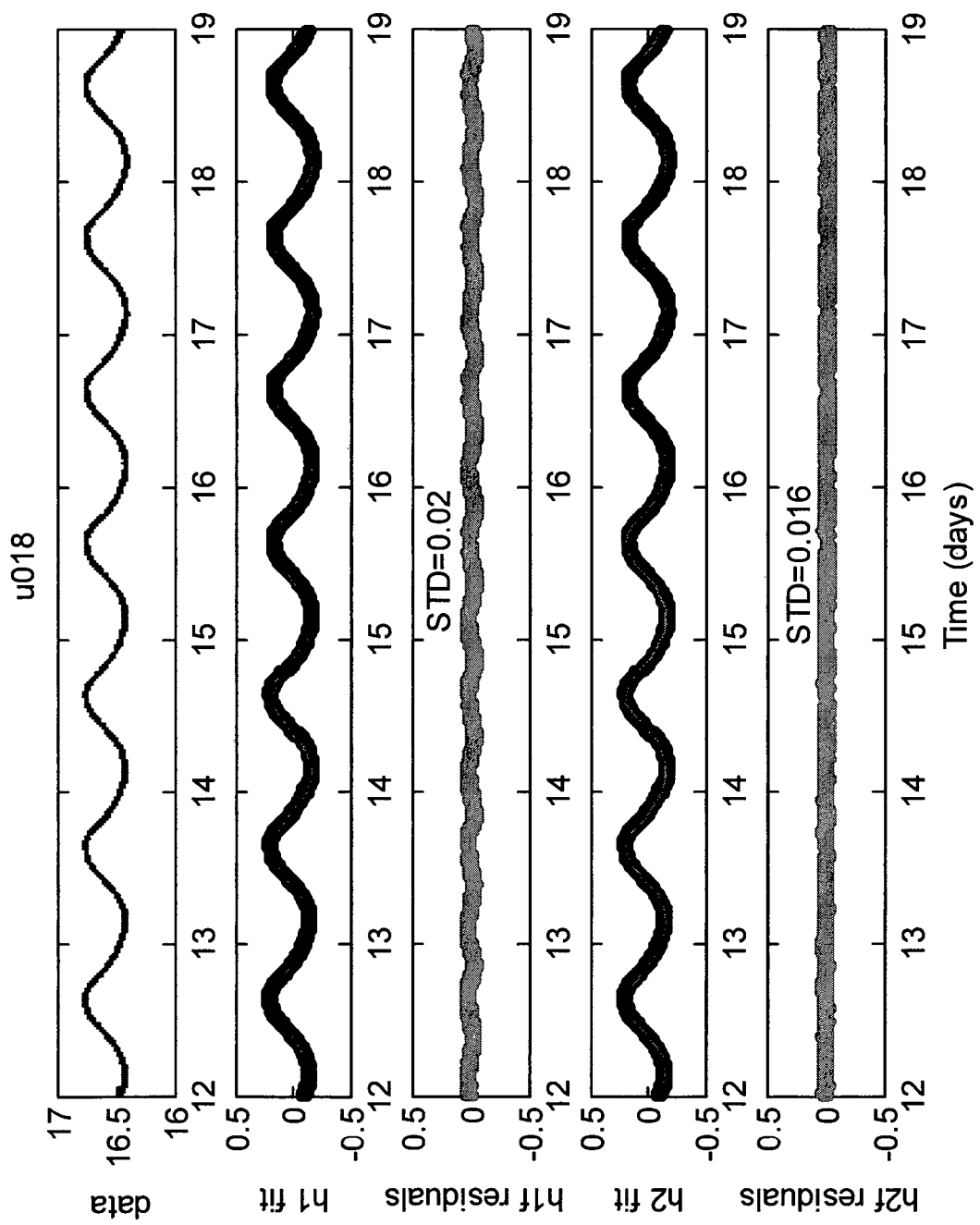

FIG. 11B is a power spectrum (power vs. frequency) graph for the data of FIG. 11A showing a strong first harmonic at a one day period and a second weaker harmonic having a 0.5 day period FIG. 12 is a set of 5 graphs respectively showing the data of FIG. 11A, first harmonic fit, residuals from the first harmonic fit, second harmonic fit and residuals from the second harmonic fit. The standard deviation of the residual data is indicated, in this figure and in similar figures described herein, on the relevant panels (graphs).

Figure 13:
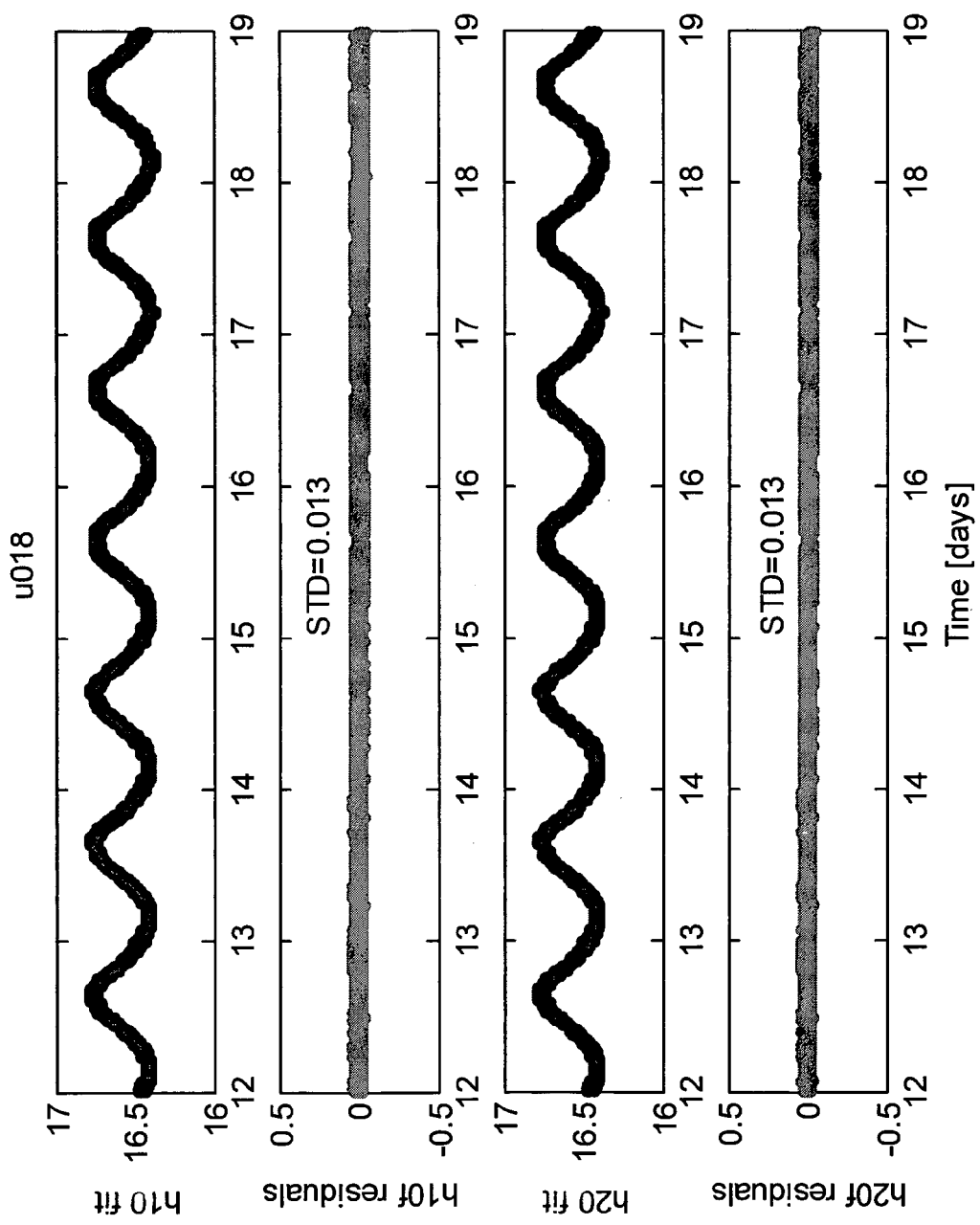

FIG. 13 is a set of 4 graphs respectively showing a 10-harmonic fit to the data of FIG. 11A, the residuals thereof, a 20-harmonic fit to the data of FIG. 11A, and the residuals thereof. It is appreciated that as harmonics are added, the standard deviation decreases, as shown.

FIG. 14 is a set of 5 graphs respectively showing a second stream of data which is less sinusoidal than the data of FIG. 11A; a first harmonic fit thereto which is less successful than the first harmonic fit of FIG. 12, residuals from the first harmonic fit to the second stream of data, second harmonic fit to the second stream of data, and residuals from the second harmonic fit.

FIG. 15 is a power spectrum (power vs. frequency) graph for the data of FIG. 14 showing a second harmonic which, since the data are less sinusoidal, is much stronger than the second harmonic of FIG. 11B, relative to the first harmonic.

Figure 16:
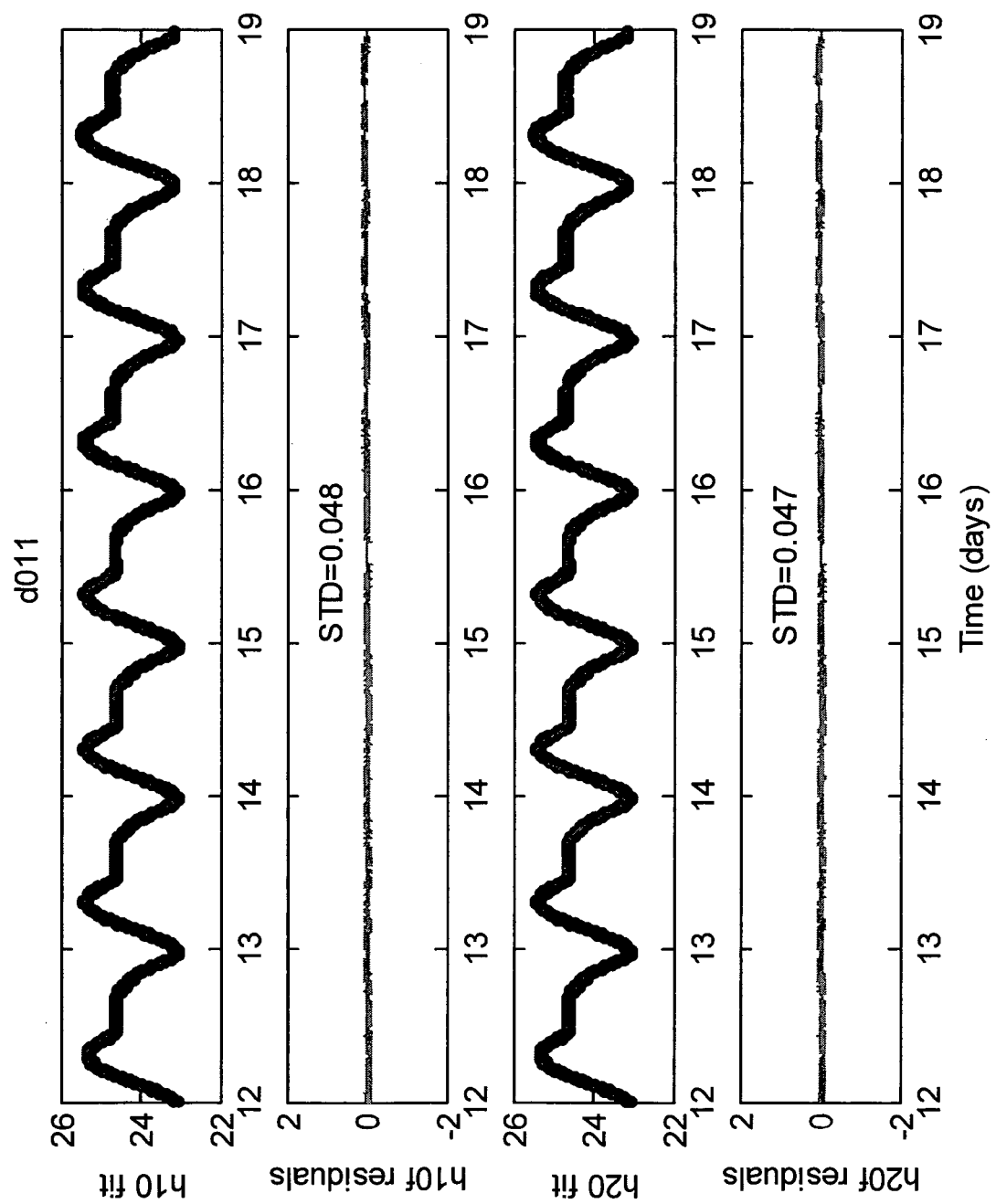

FIG. 16 is a set of 4 graphs respectively showing a 10-harmonic fit to the second data stream of FIG. 14, the residuals thereof, a 20-harmonic fit to the data of FIG. 14, and the residuals thereof. It is appreciated that as harmonics are added, the standard deviation decreases, as shown.

Figure 17:
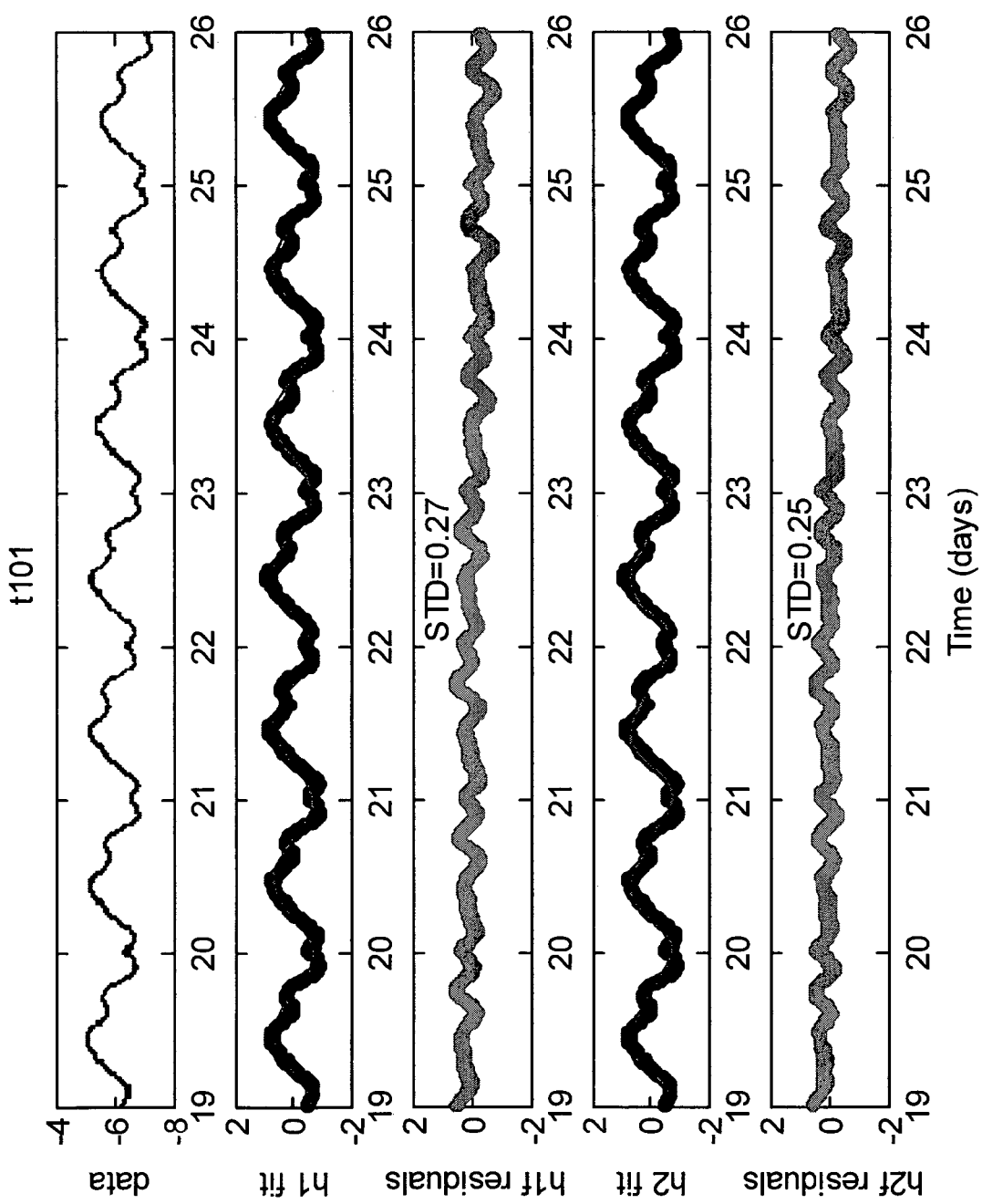

FIG. 17 is a set of 5 graphs respectively showing a third stream of data; a first harmonic fit thereto, residuals from the first harmonic fit to the second stream of data, second harmonic fit to the fourth stream of data, and residuals from the second harmonic fit.

Figure 18:
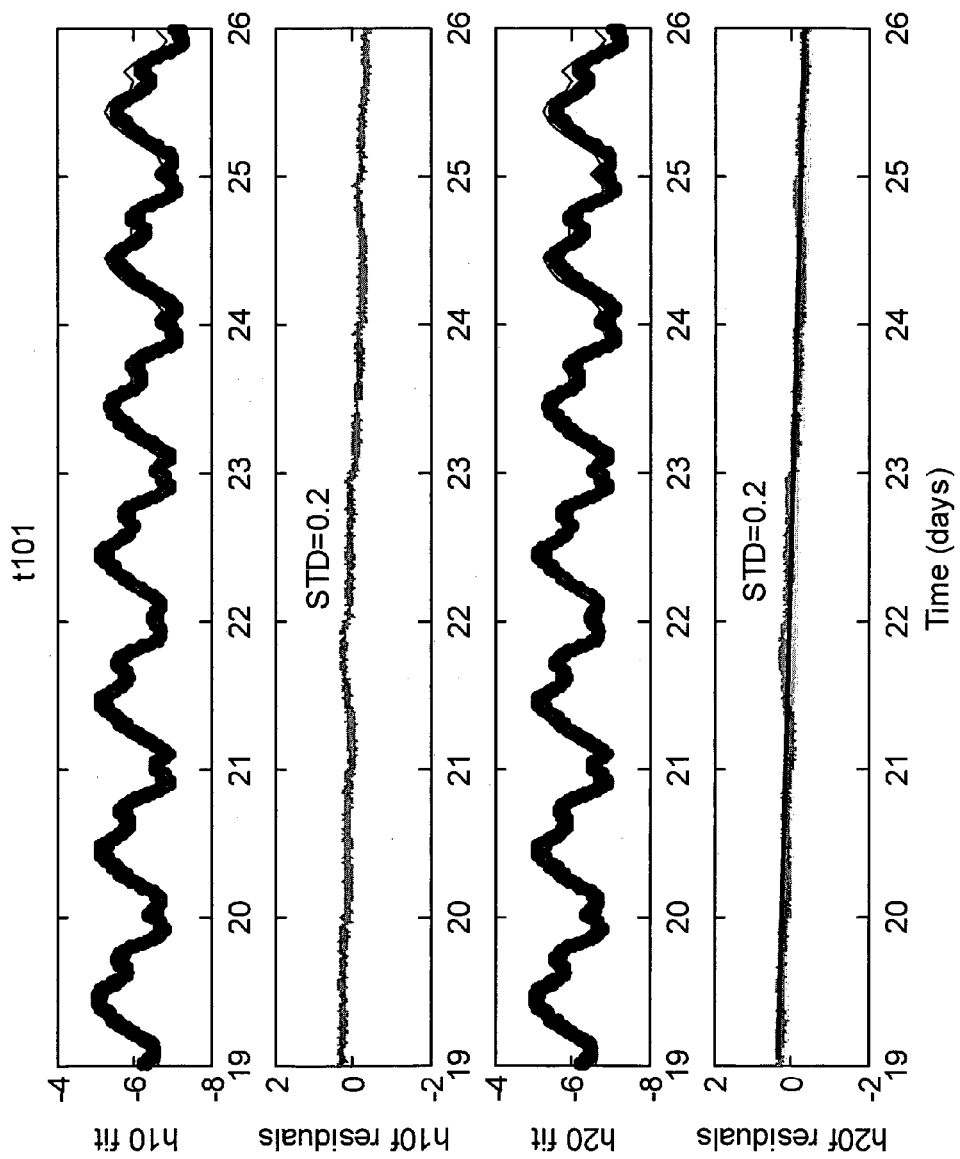

FIG. 18 is a set of 4 graphs respectively showing a 10-harmonic fit to the third data stream of FIG. 17, the residuals thereof, a 20-harmonic fit to the data of FIG. 17, and the residuals thereof, which show a slope which remains after all 20 harmonics have been fitted. It is appreciated that as harmonics are added, the standard deviation decreases, as shown. The residual data still is characterized by a slope.

Figure 19:
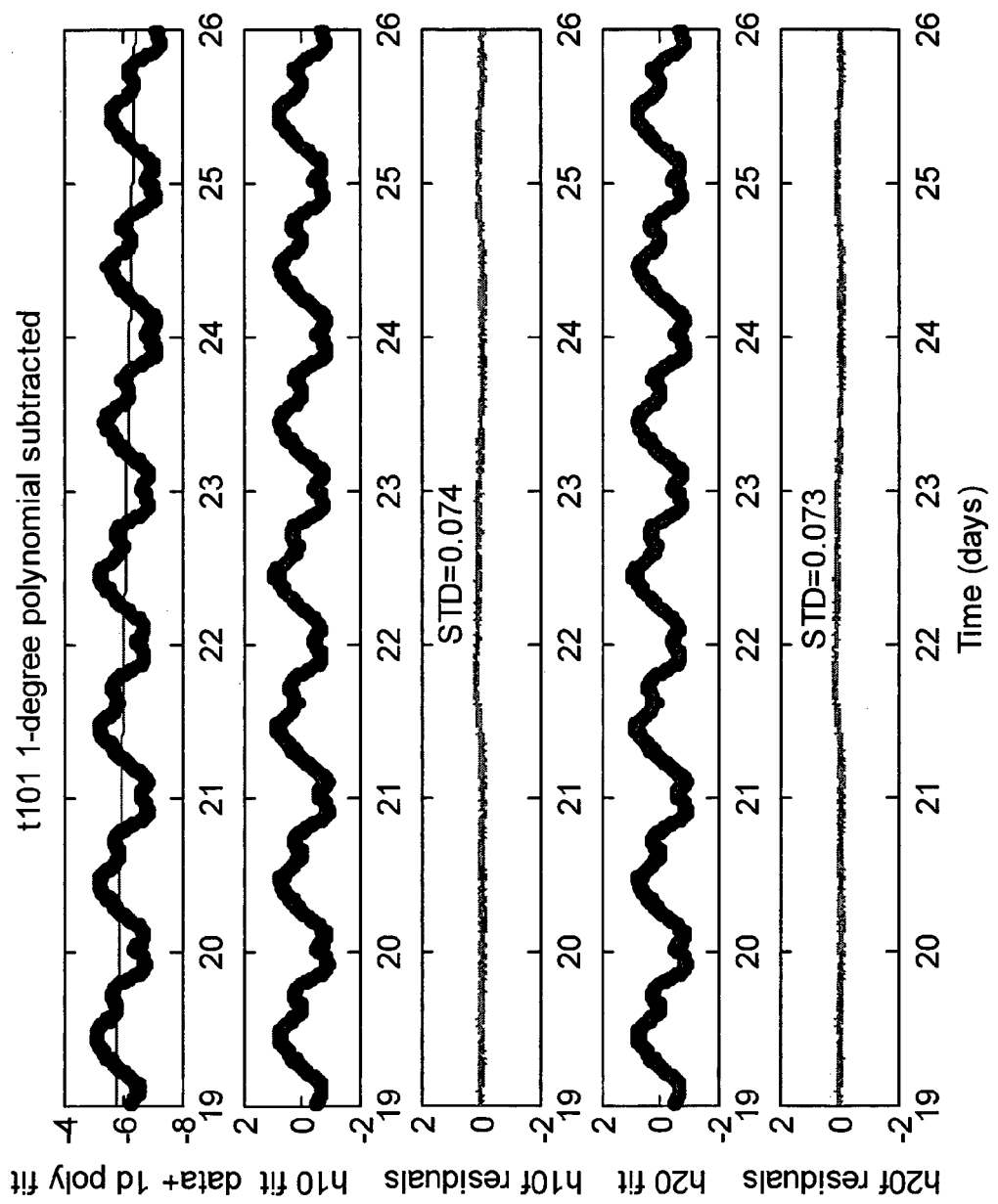

FIG. 19 is a set of 5 graphs in which a first degree polynomial, with a slope as determined from the last graph of FIG. 18, is first subtracted from the third data stream of FIG. 17, and using the difference data, graphs of a 10-harmonic fit, the residuals thereof, a 20-harmonic fit, and the residuals thereof, are shown. Here the residual data have no slope and the final standard deviation (0.073, in the illustrated example) after subtracting the slope is significantly lower than without this term, as shown in FIG. 18.

Figure 20:
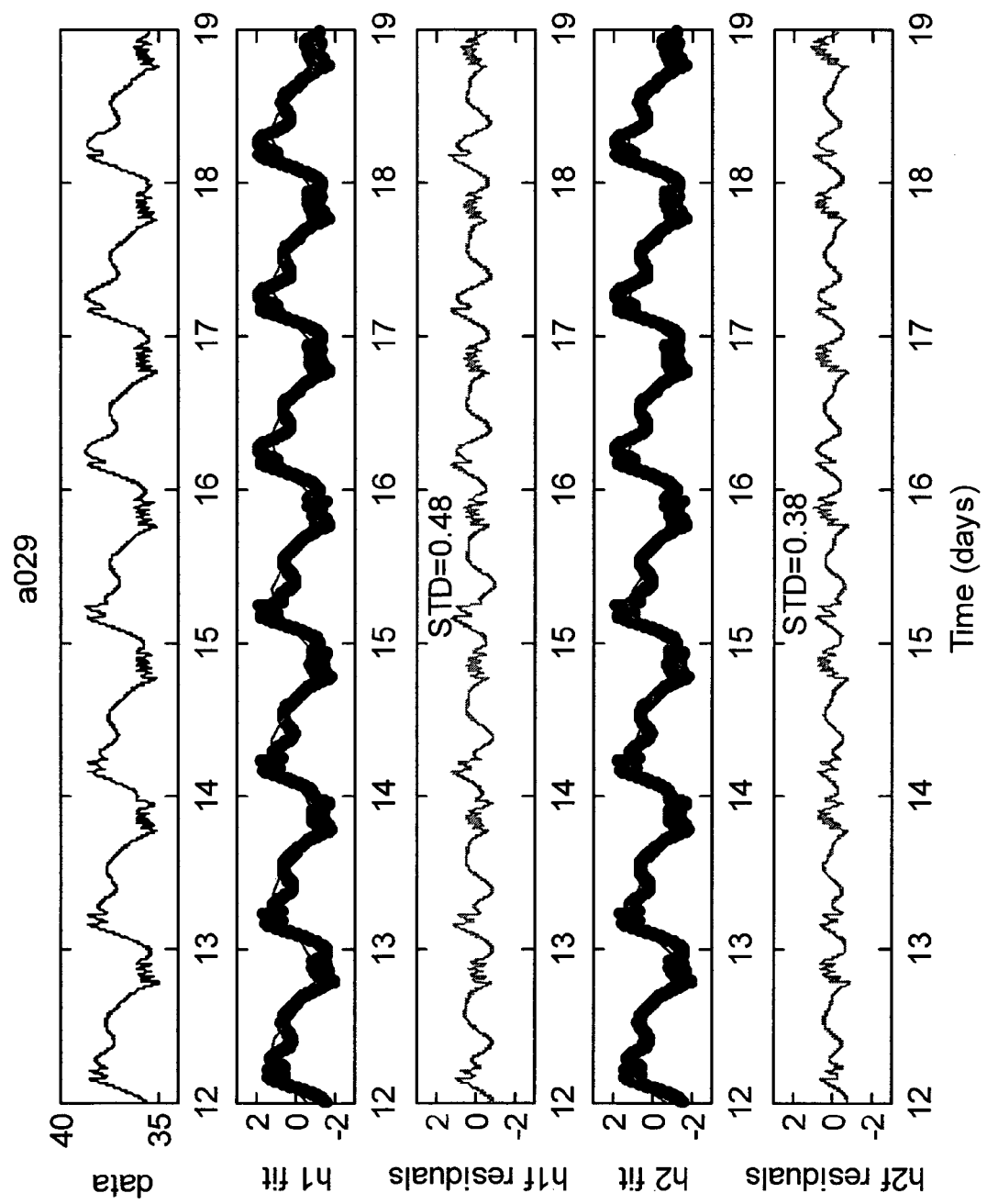
FIGS. 20-24 are graphs illustrating examples of operation of steps 310 and 320 of FIG. 3A pertaining to visual inspection of data and period and semi-period finding, respectively.

FIGS. 20-24 are examples of an application of the method of FIG. 6. In particular:

FIG. 20 is a set of 5 graphs respectively showing a fourth data stream, first harmonic fit, residuals from the first harmonic fit, second harmonic fit and residuals from the second harmonic fit.

Figure 21:
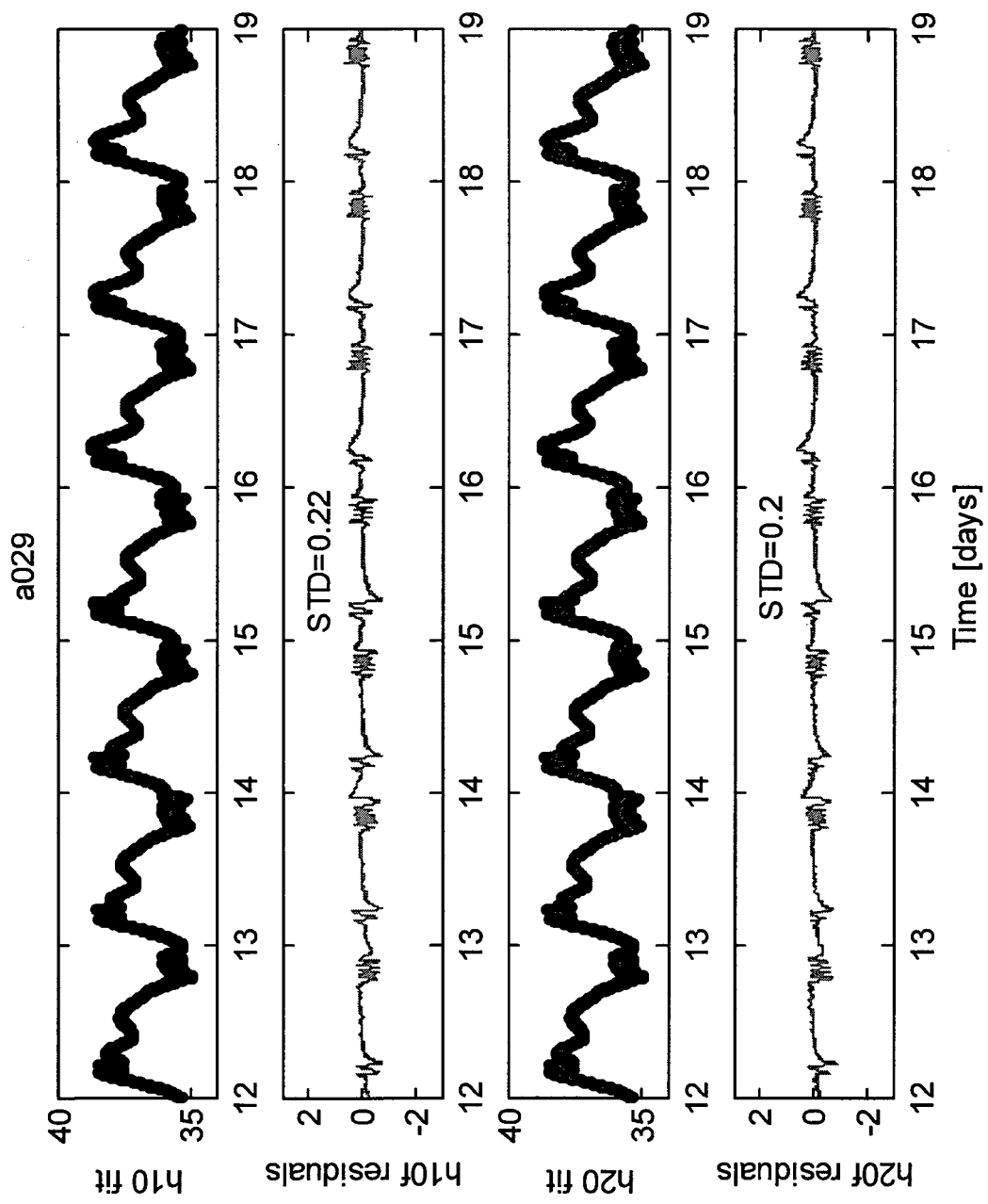

FIG. 21 is a set of 4 graphs respectively showing a 10-harmonic fit to the fourth data stream of FIG. 20, the residuals thereof, a 20-harmonic fit to the data of FIG. 17, and the residuals thereof. It is appreciated that as harmonics are added, the standard deviation decreases as shown.

Figure 22:
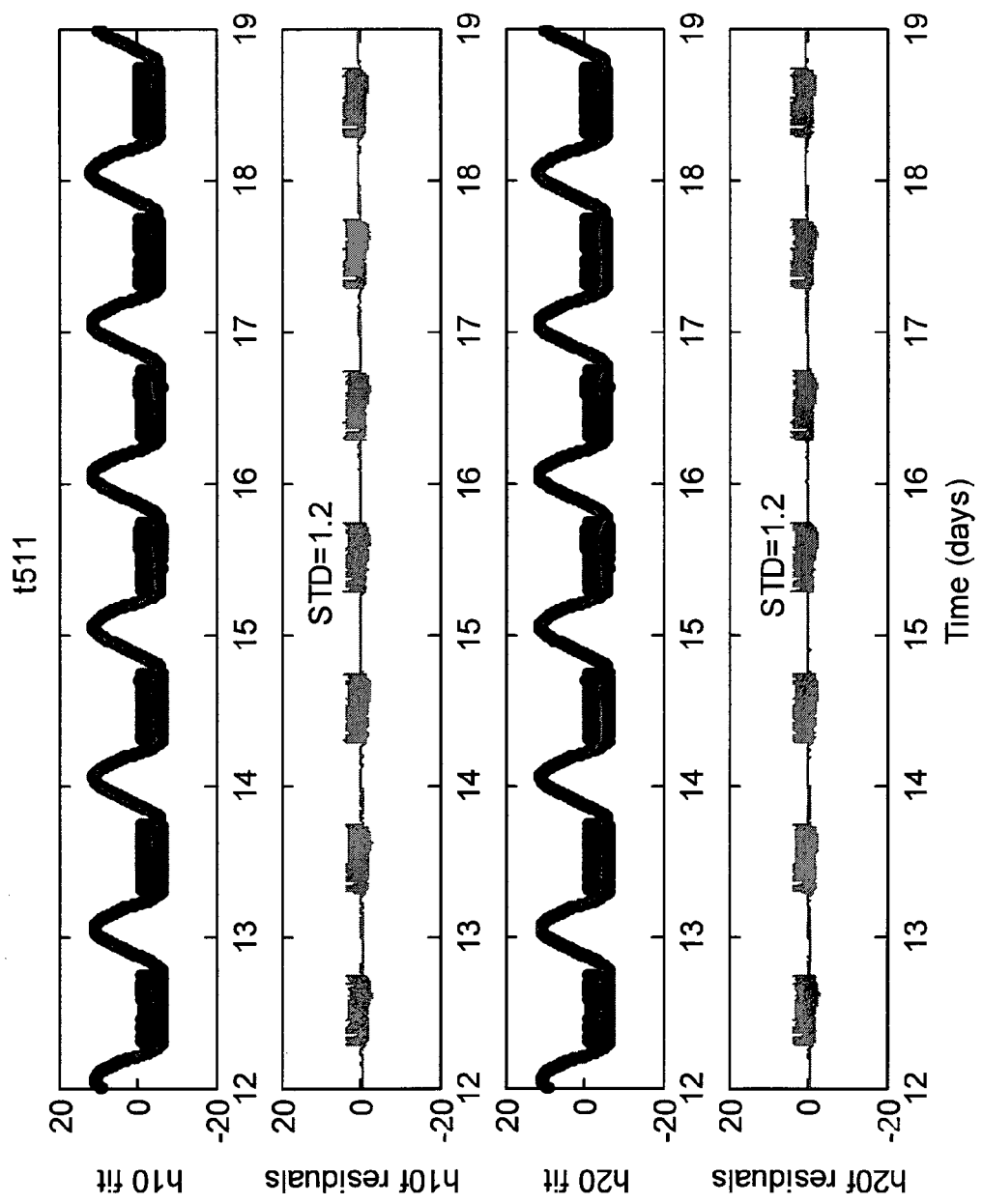

FIG. 22 is a set of 4 graphs respectively showing a 10-harmonic fit to a fifth data stream, the residuals thereof, a 20-harmonic fit, and the residuals thereof.

Figure 23:
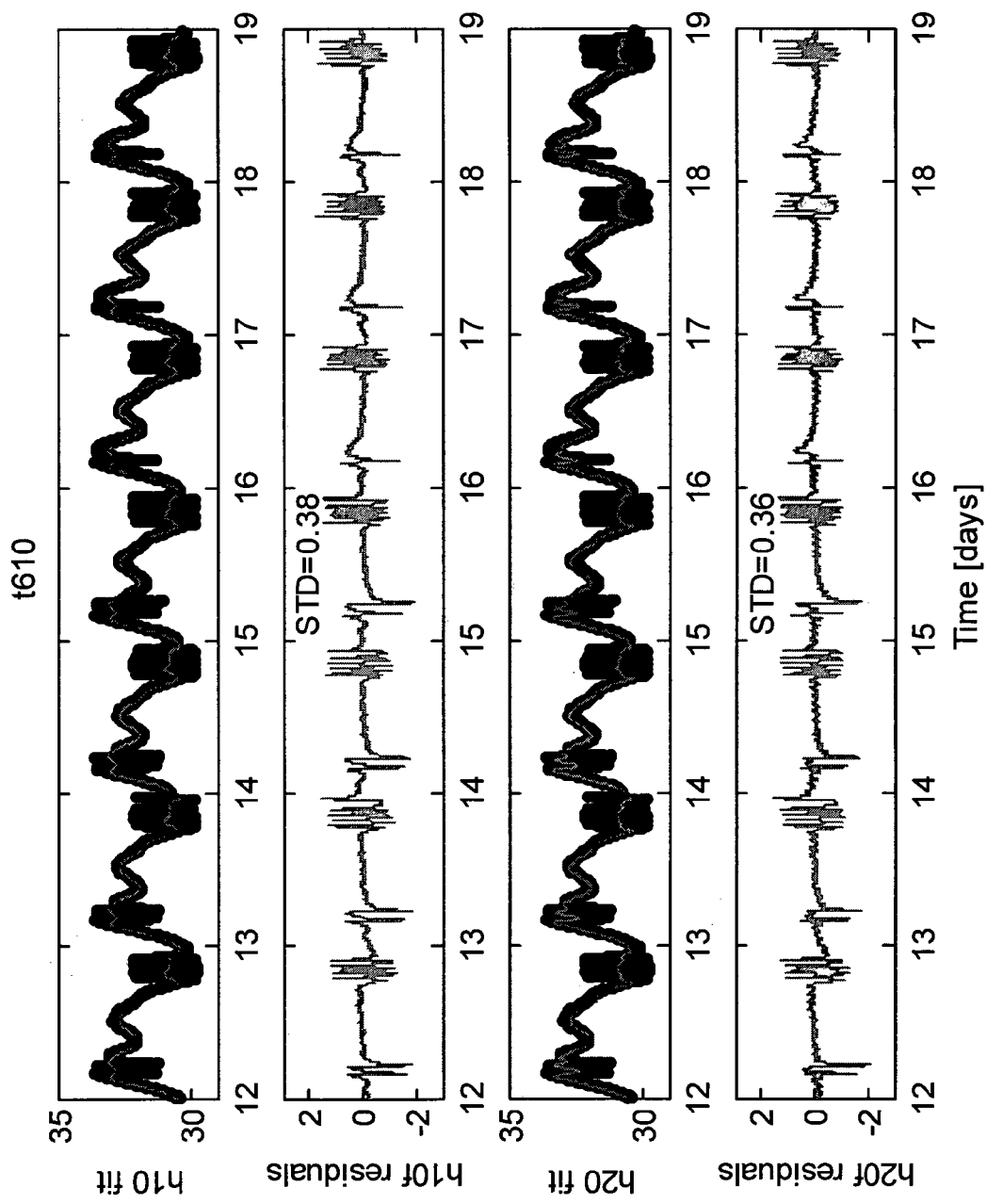

FIG. 23 is a set of 4 graphs respectively showing a 10-harmonic fit to a sixth data stream, the residuals thereof, a 20-harmonic fit, and the residuals thereof.

Figure 24:
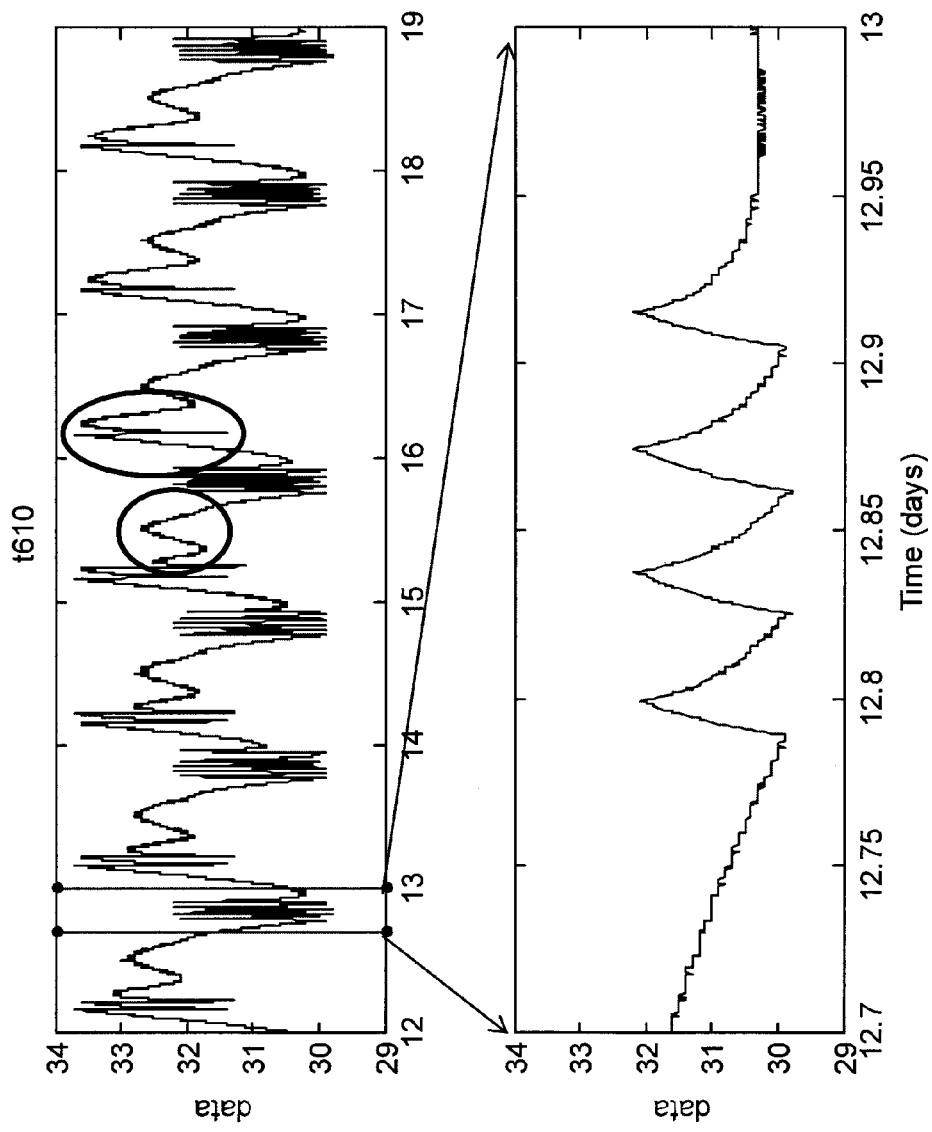

FIG. 24 shows an enlarged view of the sixth data stream of FIG. 23, showing that the data are modulated with a 1-day period, but in addition, there is also a semi-period that only appears during certain hours of the day and is inactive at other times.

FIGS. 20-24 are examples of operation of steps 310 and 320 of FIG. 3A pertaining to visual inspection of data and period and semi-period finding, respectively. To find a semi period that only appears during certain cycles of a, say, 1-day period, it is possible to determine, automatically or by inspection, when the semi-period is active, use only these data to find the value of the semi period, and build a model where the semi period is active only during activity hours, and zero elsewhere. For example, visual or automated inspection of FIGS. 23 and 24 may yield that the data has two semi periods, one at the beginning of the day, and one at the end. The mean shape of the 1-d variation may be subtracted to achieve a good fit.

Figure 25:
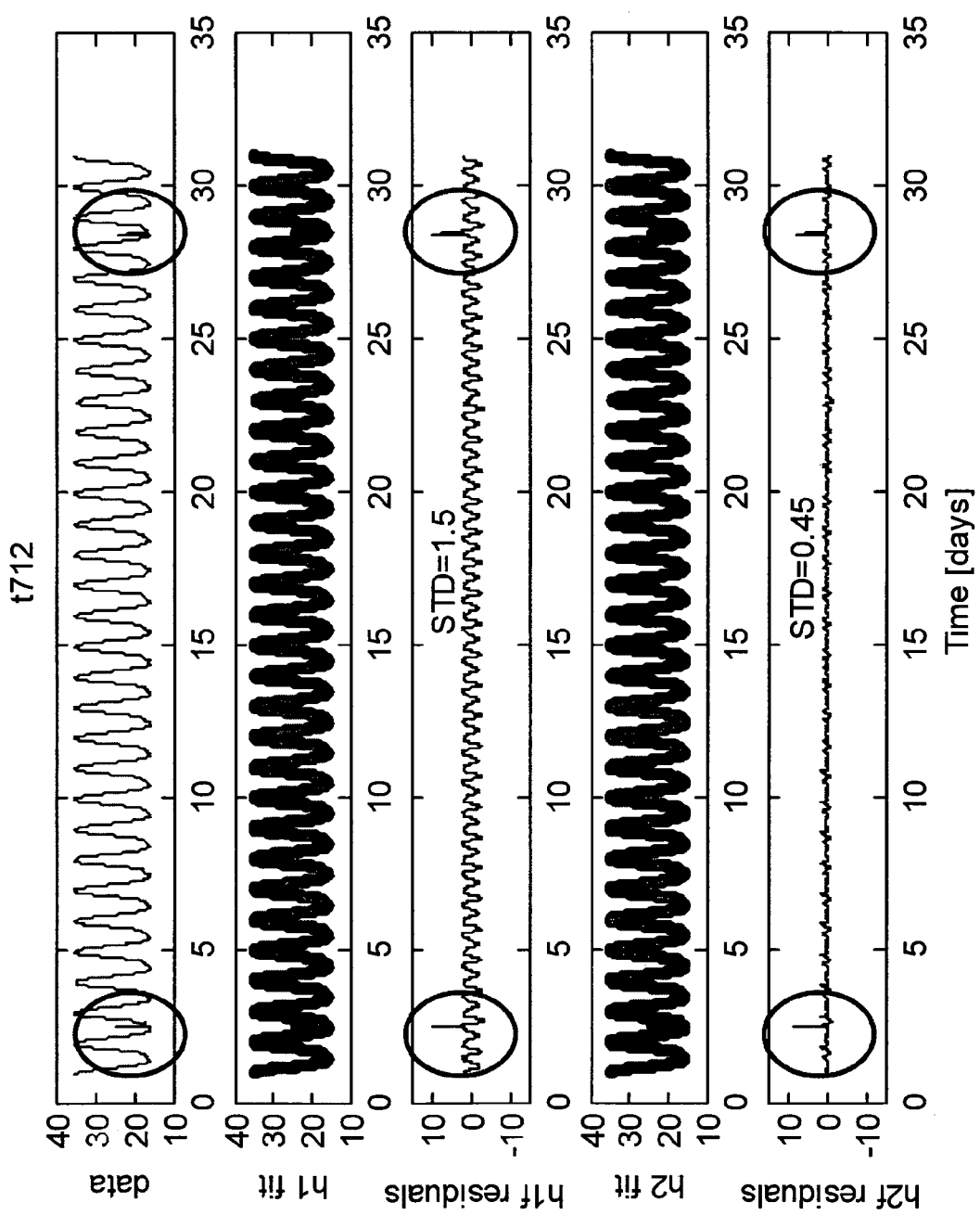
FIG. 25 is a set of 5 graphs respectively showing a data stream, first harmonic fit, residuals from the first harmonic fit, second harmonic fit and residuals from the second harmonic fit.

FIG. 25 is a set of 5 graphs respectively showing a seventh data stream, first harmonic fit, residuals from the first harmonic fit, second harmonic fit and residuals from the second harmonic fit. Two anomalous episodes in the first data sequence are clearly identifiable in the residuals from the second harmonic fit and are indicated by bubbles.

Figure 26:
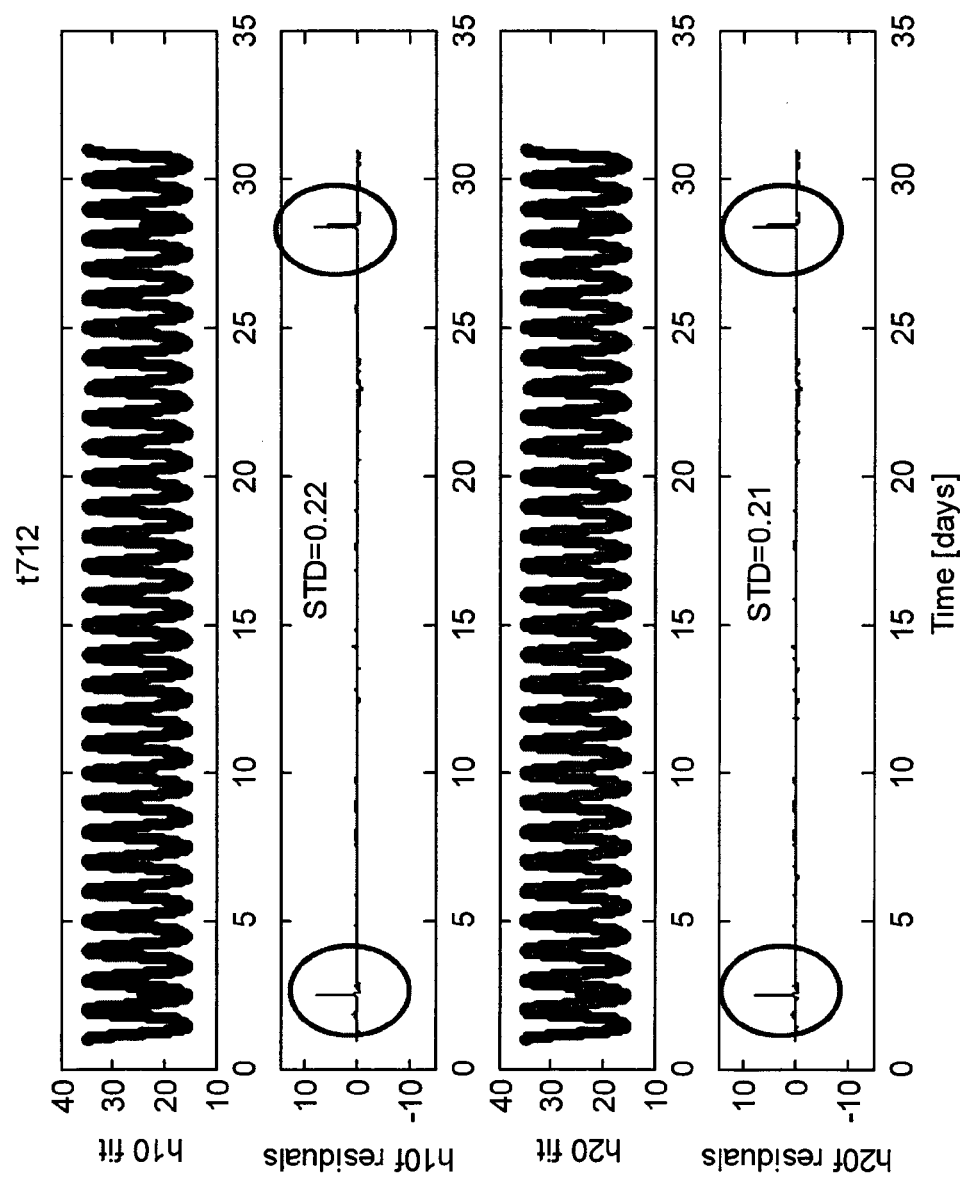
FIG. 26 is a set of 4 graphs respectively showing a 10-harmonic fit to the data of FIG. 25, the residuals thereof, a 20-harmonic fit to the data of FIG. 11A, and the residuals thereof.

FIG. 26 is a set of 4 graphs respectively showing a 10-harmonic fit to the data of FIG. 25, the residuals thereof, a 20-harmonic fit to the data of FIG. 11A, and the residuals thereof.

Figure 27:
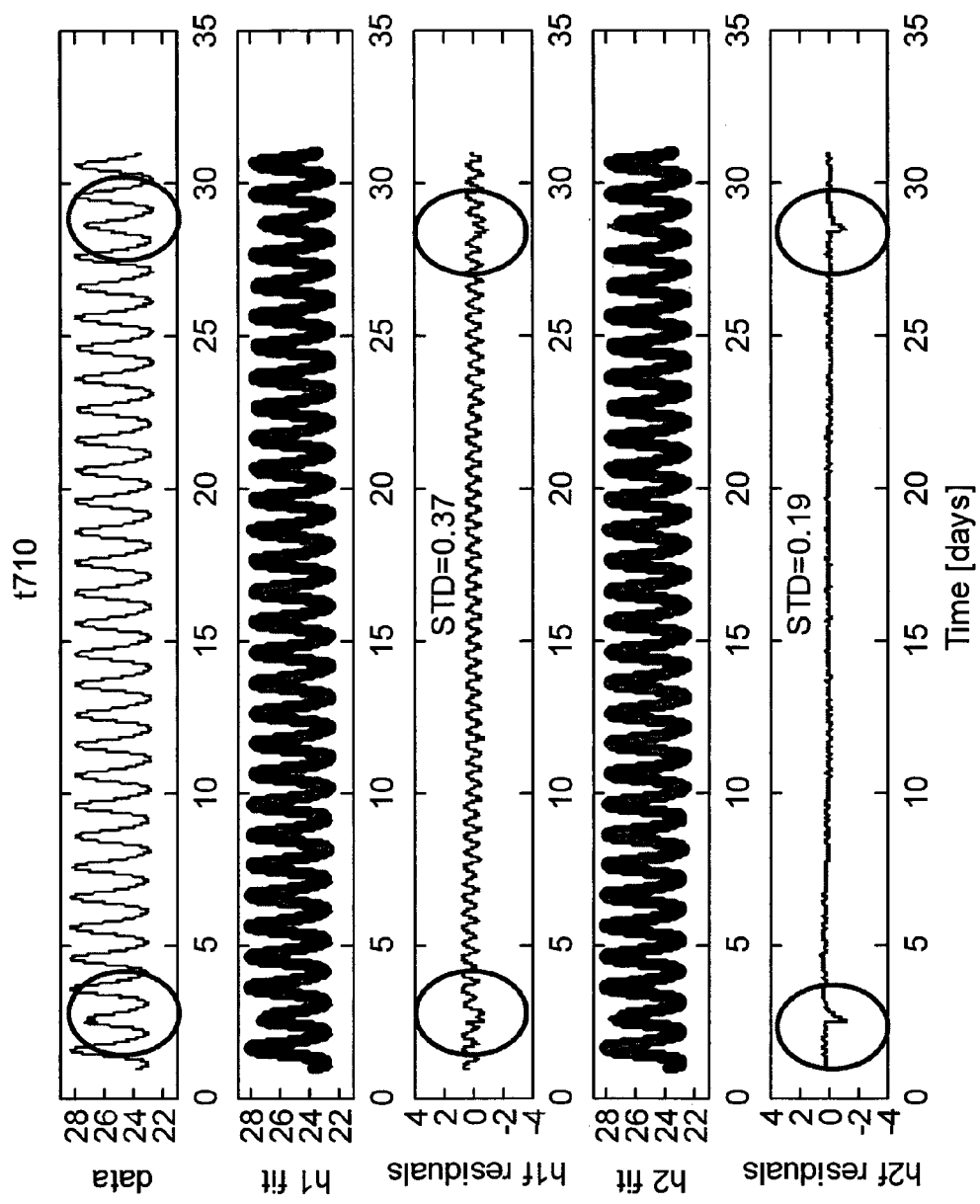
FIG. 27 is a set of 5 graphs respectively showing another data stream, first harmonic fit, residuals from the first harmonic fit, second harmonic fit and residuals from the second harmonic fit.

FIG. 27 is a set of 5 graphs respectively showing an eighth data stream, first harmonic fit, residuals from the first harmonic fit, second harmonic fit and residuals from the second harmonic fit. Two anomalous episodes in the first data sequence are clearly identifiable in the residuals from the second harmonic fit and are indicated by bubbles.

Figure 28:
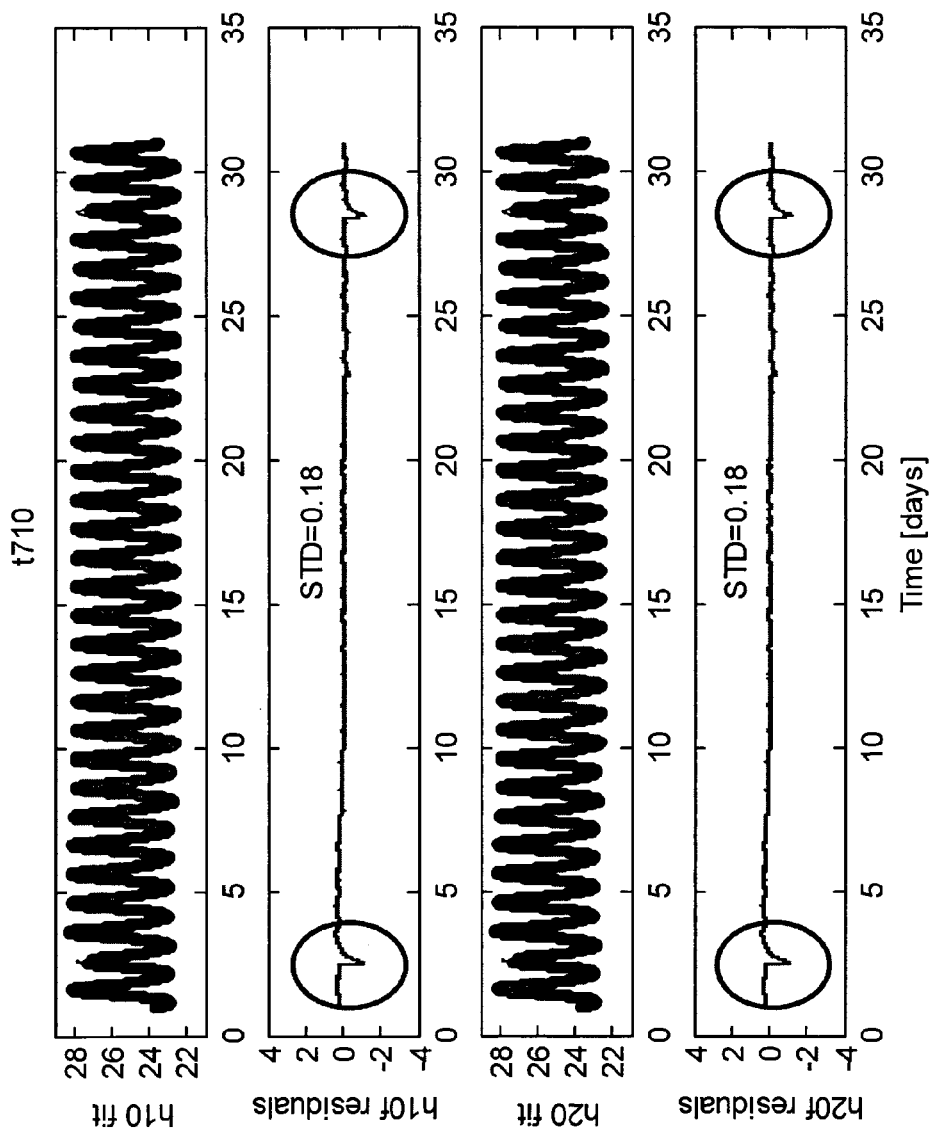
FIG. 28 is a set of 4 graphs respectively showing a 10-harmonic fit to the data of FIG. 27, the residuals thereof, a 20-harmonic fit to the data of FIG. 11A, and the residuals thereof.

FIG. 28 is a set of 4 graphs respectively showing a 10-harmonic fit to the data of FIG. 27, the residuals thereof, a 20-harmonic fit to the data of FIG. 11A, and the residuals thereof.

As is evident from FIGS. 25-26 and from FIGS. 27-28, anomalous episodes rise higher above the noise as more harmonics are subtracted.

Figure 29:
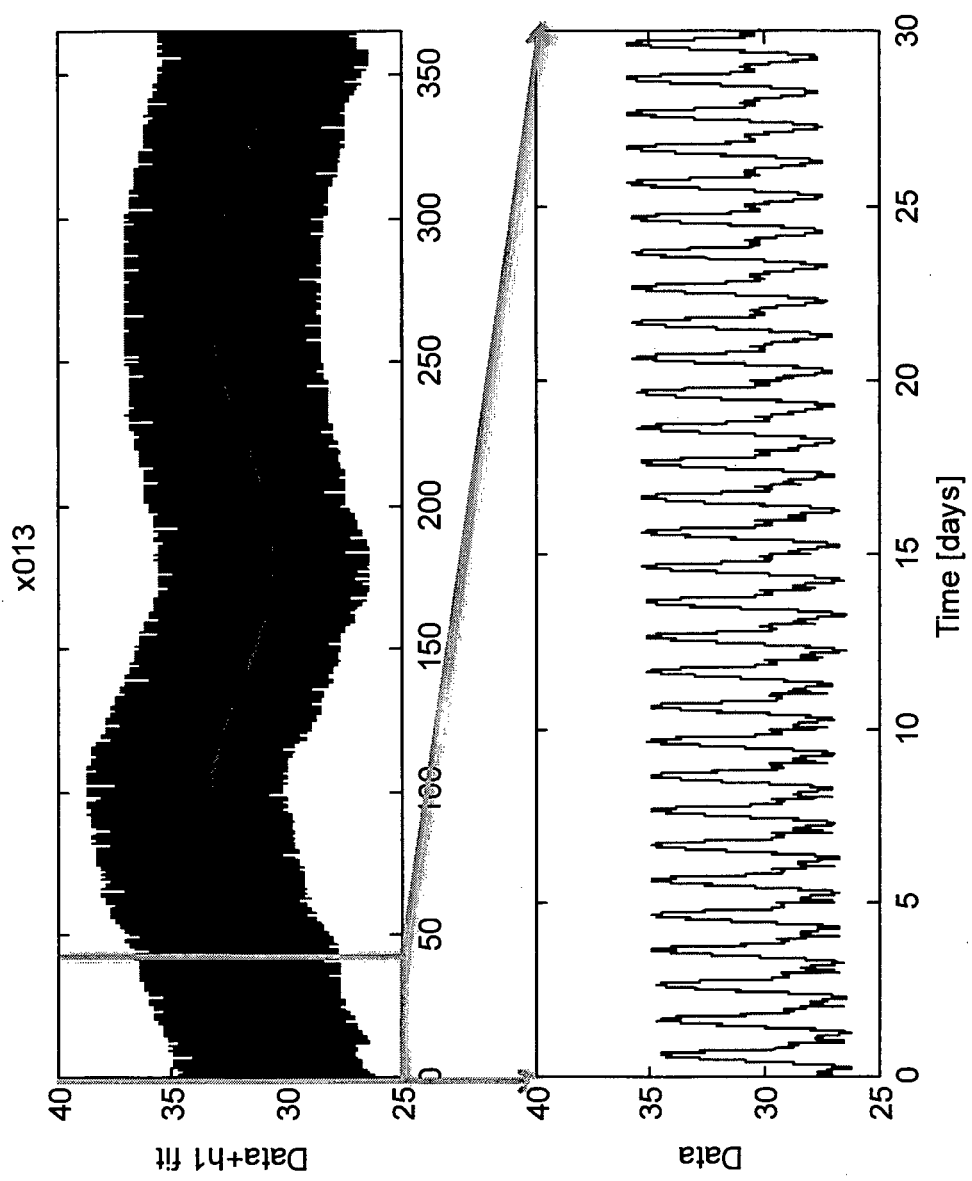
FIGS. 29-34 are graphs illustrating an example of an application of the method of FIG. 4A.

FIGS. 29-34 are an example of an application of the method of FIG. 4A. In particular:

FIG. 29 is a pair of graphs including (top panel) a ninth data stream, which spans over a full year. A half-year period may be identified automatically or by a visual inspection, and the first harmonic fit is shown. The bottom panel shows a zoom into the first month, in which a one-day period is seen to occur. The presence of the half-year period is, of course, not apparent since the bottom graph's domain is only 30 days.

Figure 30:
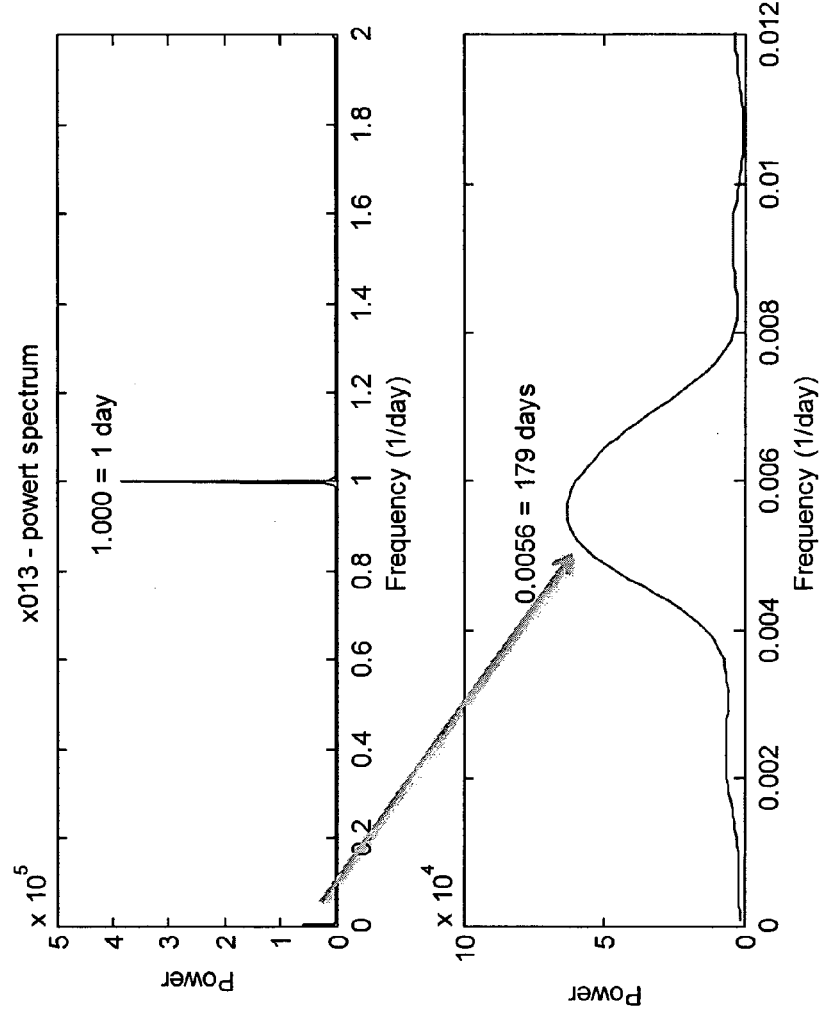

FIG. 30 is a power spectrum (power vs. frequency) graph for the data of FIG. 29, including a top graph with a one-day period and a bottom graph, which is a zoom into small frequencies, as shown on the left side of the top panel, with a half year period, which shows a large error.

Figure 31:
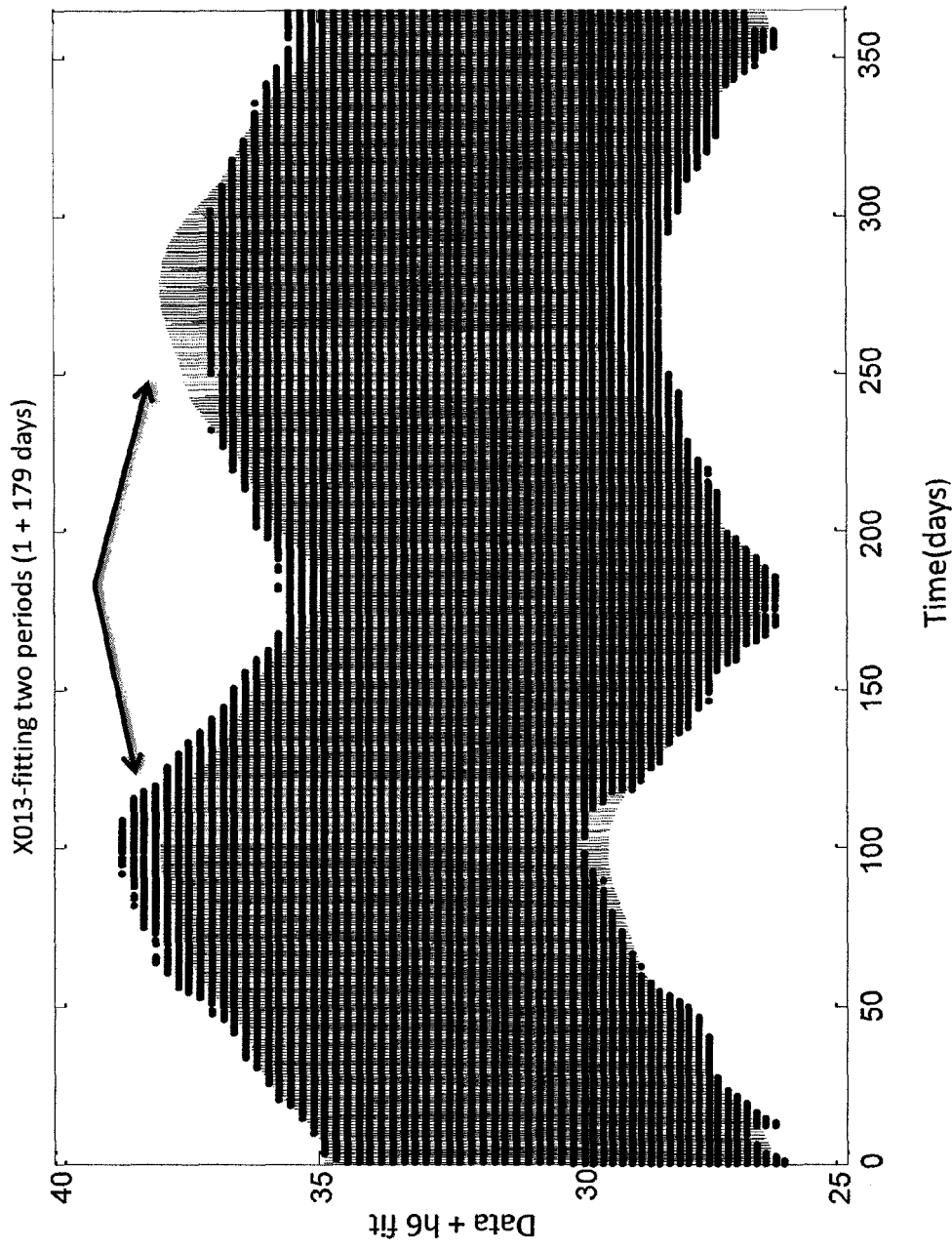

FIG. 31 is a graph of a 6-harmony fit for the two periods of the ninth data stream. It is appreciated that the long, half-year period is not entirely stable as is apparent from the truncated crest of the second peak (at about 220-300 days).

Figure 32:
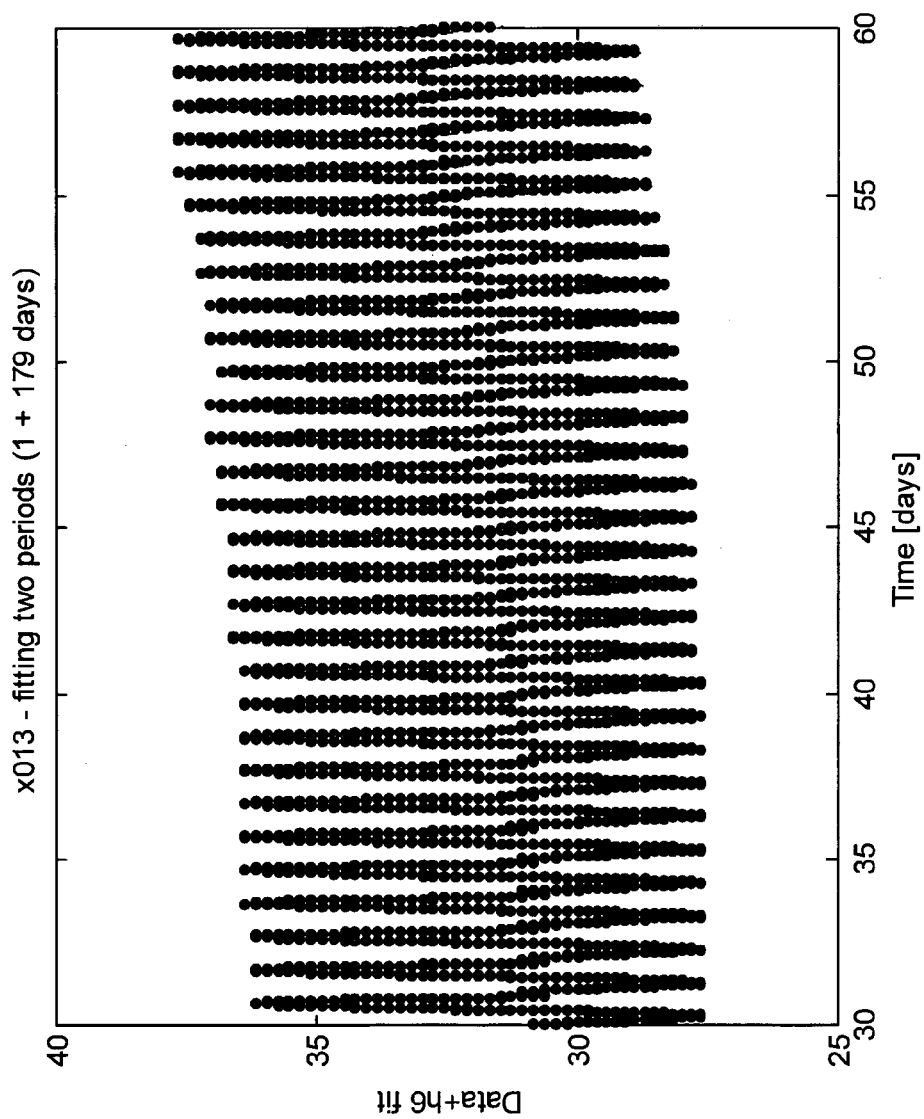

FIG. 32 is an enlargement of the graph of FIG. 31, over only 30 days vs. the one year domain of the graph of FIG. 31.

Figure 33:
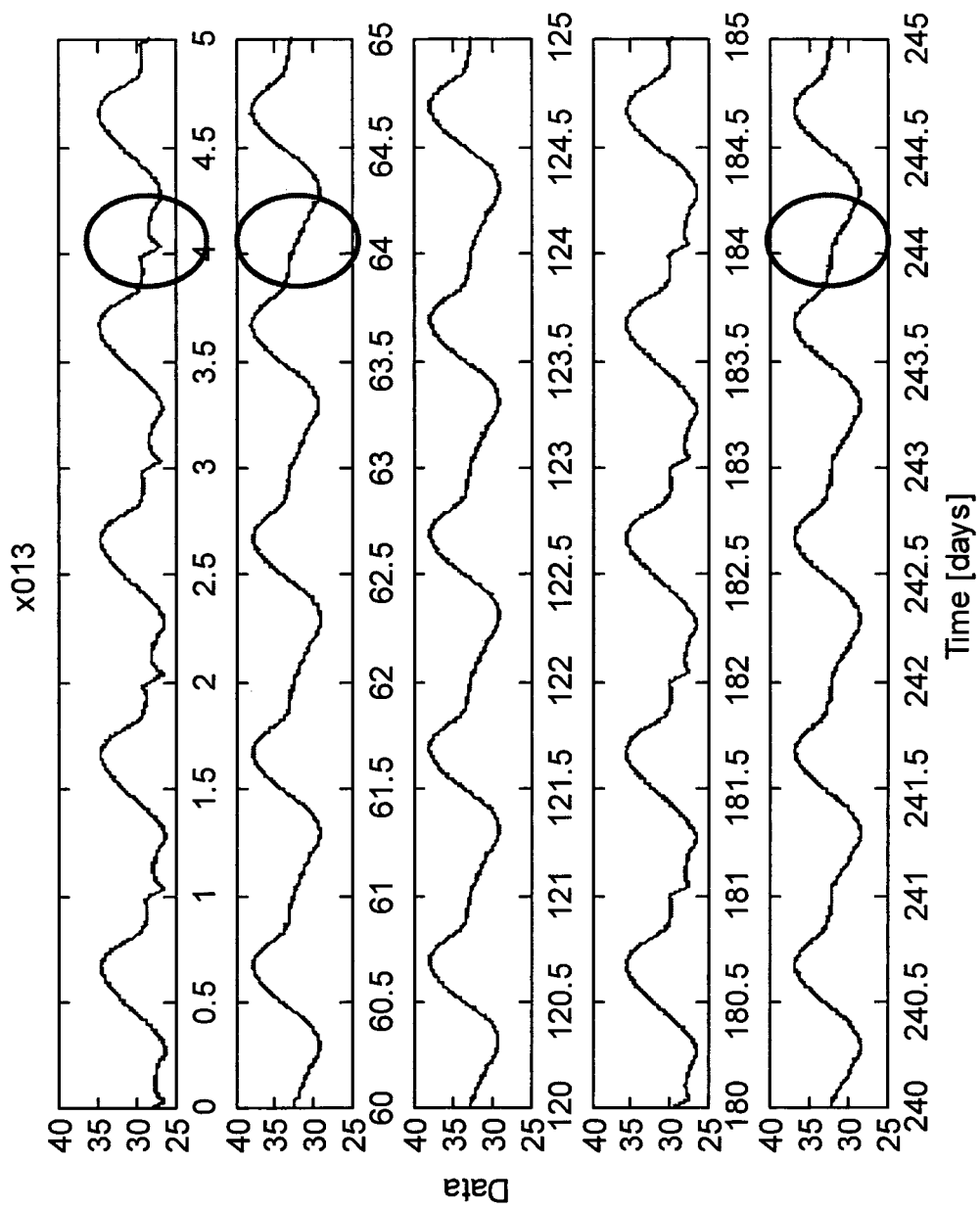

FIG. 33 is a set of graphs each showing 5 days-worth of the data of FIG. 31. Adjacent graphs are 2 months apart.

Figure 34:
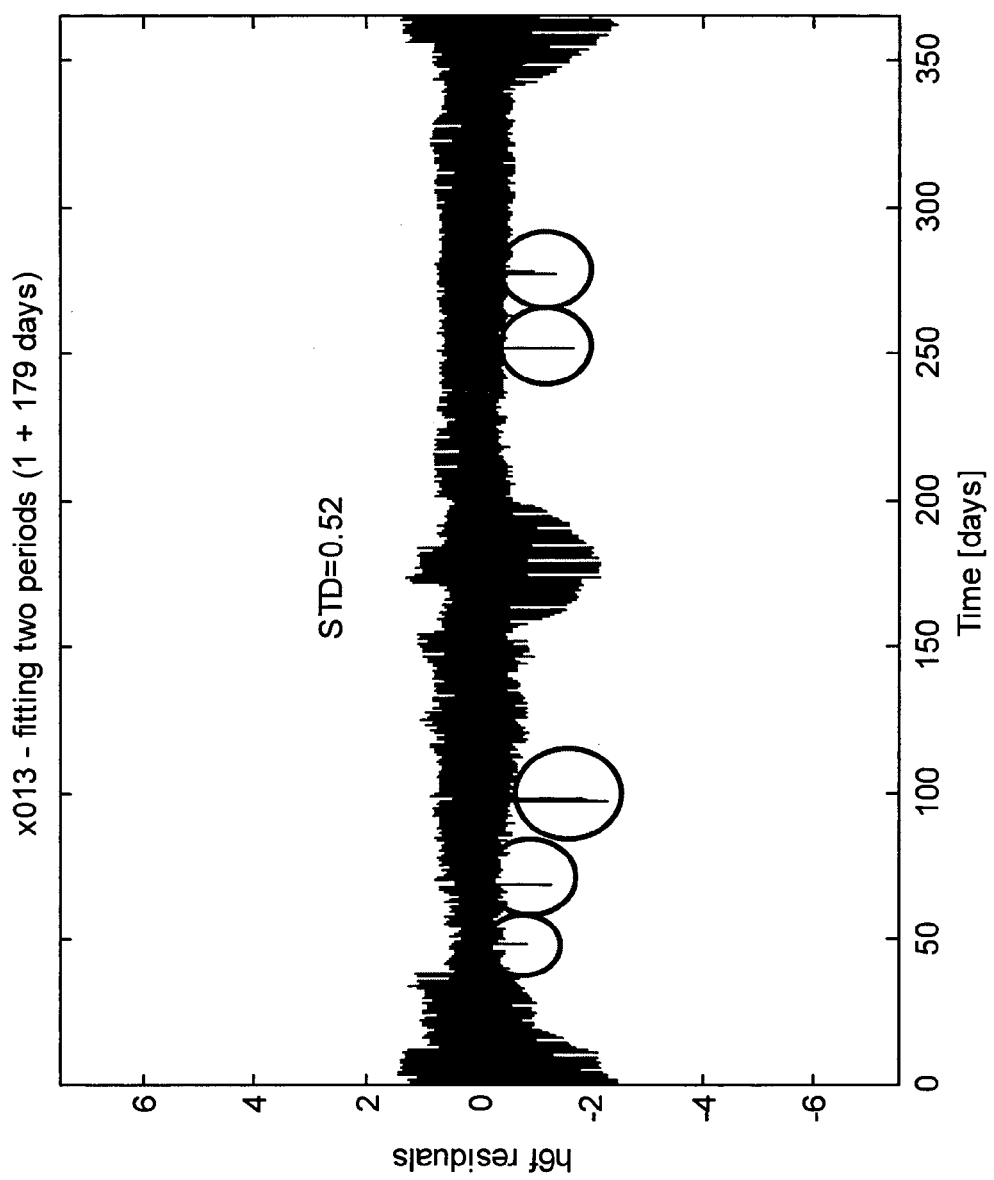

FIG. 34 is a graph of a sixth-harmonic residual of the ninth data stream; in which anomalous episodes are identifiable, although the residual has a greater variance than the residuals, say in FIGS. 12-14 and 16.

Referring again to the method of FIG. 4A, it is appreciated that FIG. 29 corresponds to step 480. The visual inspection of the data shows that there are two periods. The presence of the two periods is evident by a visual inspection. The presence of the second period may only be apparent a by visual inspection of the residuals or even only by analyzing the power spectrum of the residual data. FIG. 30 corresponds to step 490 of FIG. 4A. Inspection of the power spectrum shows that there are two periods, such that the residual data after the subtraction of the first period need not be checked in order to identify presence of the second period. FIG. 31 corresponds to step 570, showing the fit. FIG. 34 corresponds to steps 430 and 440 in which the model is subtracted from the data and anomalous points and episodes are identified; significance computations are not shown.

It is appreciated, then, that certain embodiments of the invention are particularly cited for periodic and semi-periodic variations, even those which have no sinusoidal shape. For a better fit, more harmonics may be used especially for non-sinusoidal and semi-periodic variations. Typically, anomalous points and episodes are better distinguished from the noise of the residual data, after subtracting the fit, relative to trying to identify these by examining raw data. Anomalous points and episodes hardly visible or even invisible to the human eye may be identified in the residual data, and typically have a high significance level.

According to certain embodiments, system monitoring based on at least semi-periodic data, as shown herein, may be entirely computerized, e.g. by providing preliminary definitions of a maximum number of periods and/or semi-periods to use, and pre-defining range of allowed periods (e.g. 0.1-100 day) and/or maximum number of harmonics which may be used; and/or minimum threshold level of noise to achieve, and possibly other parameters. Alternatively, the periodic, semi-periodic, multi-periodic methods shown herein may be provided as user-selectable operation modes of a monitoring system in which case the user, based on visual inspection of the data, would select a suitable mode and would even parameterize e.g. might key in one or more of:

the number of periods that s/he has observed
a rough estimate of the value (length) of each such period/s
a rough estimate of whether a small/high number of harmonics is required.

Similar information for semi-periods, if observed, as well as a rough time period in which each semi-period resides (since the fit is zero when the semi-period is non-active; only data within the semi-period's active period is typically used to fit the semi-period).

Examples

If the data of FIG. 11A is being used, a human user might key in information indicating that there is a period of ~1 day, which is very sinusoidal, so few harmonics need be employed, and the monitoring system would select and parameterize a method accordingly.

If the data of FIG. 14 are being used, a human user might key in information indicating that there is a period of ~1 day, which is somewhat sinusoidal, so a medium number of harmonics may be employed. The monitoring system would select and parameterize a method accordingly.

If the data of FIG. 18 (top panel) is being used, a human user might key in information indicating that there is a period of ~1 day, which is somewhat sinusoidal, so a medium number of harmonics may be employed. A human user may also determine that a linear trend is present. The monitoring system may receive this information via a suitable user interface and may select and parameterize a method accordingly.

If the data of FIGS. 20, 22 and 23 (top panels) and of FIG. 24 are being used, a human user might key in information indicating that there is a period of ~1 day, and a semi-period of ~0.1 day that appears during certain hours of the day. In example, a user's visual inspection of FIG. 22 may show that in addition to the 1-d period, there is a shorter period (rough estimate by eye ~0.05 day) that appears only between phases ~0.25-~0.75 (rough estimate by eye) of the 1-day cycle. The monitoring system would select and parameterize a method accordingly (e.g. would use the method of FIG. 4A rather than, say, the method of FIG. 2).

The following analysis may be performed: find the cycle intervals where the semi-period is active and check only these data. Compute the power spectrum to find the semi-period value, and then build the semi-period fit only for these intervals, using zero for the time intervals where it is inactive. This may be done automatically, if suitable parameters are defined in advance. Alternatively, check whether a mean shape of the 1-day period is a good fit to the data and subtract it to find anomalies.

If the data of FIG. 25 and of FIG. 27 (top panel) are being used, a human user might key in information indicating that there is a period of ~1 day, which is very sinusoidal, so few harmonics are needed. The monitoring system would select and parameterize a method accordingly.

If the data of FIG. 29 is being used, a human user might key in information indicating that there are two periods of ~1 day & ~180 day. The monitoring system would select and parameterize a method accordingly.

Generally, highly sinusoidal data requires less harmonics.

According to certain embodiments, the monitoring system may provide a "trial run" to check that a user-selected model works, before reverting to automatic monitoring mode.

It is appreciated that when identifying wayward points, also termed herein "anomalous points", the average of the residual data, which should be zero or very near zero for a poor fit, is typically not used as a criterion in order to find the anomalous points. Instead the standard deviation (STD) of the data is thresholded to identify these points. Since the residual points are typically normally distributed around zero, with positive as well as negative points, the more points available, the higher the chance to find points at the edge of the distribution, and this typically determines the threshold which is used to identify wayward points. Specifically, assuming normal distribution, about 70% of all points are found within one STD (−1 sigma-+1 sigma). About 99% of all points are found within ~2 STD (−2sigma-+2sigma), etc.

Example: Among a sample of 10 points, 3 points are expected within 1 sigma and 0.1 within 2 sigma, so even a 2-sigma point is typically considered highly significant hence may be considered wayward. However, among one million points a point that deviates by 3-sigma is not very rare, and a higher threshold, say 5 or 6 sigma, may be employed to identify wayward points.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized method for monitoring physical data, generated by a physical data generator, for anomalies, said physical data being predictable subject to predetermined information characterizing said physical data generator, the method comprising:
using said predetermined information to compute a sequence of predicted data points which the physical data, given said predetermined information, can be expected to duplicate at each of a corresponding sequence of temporal sampling points; and
receiving the physical data and identifying wayward points within said physical data which are incongruous with the predetermined information.

2. A method according to claim 1, wherein said monitoring includes subtracting each predicted data point from a corresponding physical data point thereby to generate a sequence of residual data points.

3. A method according to claim 1 wherein said data are characterized by periodic variations such as multi-periodic variations and said variations are taken into account when identifying wayward points.

4. A method according to claim 2 and also comprising displaying said residual data points to a user.

5. A method according to claim 3 wherein at least one period characterizing said periodic variations is found using at least one of an FFT-based method and a phase dispersion minimization method.

6. A method according to claim 1 wherein said physical data comprises data generated by a satellite.

7. A method according to claim 1 wherein said physical data comprises at least one of the following:
GPS system data;
north-finding system data;
particle accelerator data;
cardiac data;
brain data (EEG);
atomic clock data;
oscillator data;
pendulum data;
solar energy data having periodicity depending on the sun's periodicity;
temperature data;
electrical equipment data; and
computer component data.

8. A computerized system for monitoring physical data for anomalies, which physical data are predictable given predetermined information, the system comprising:
a predetermined information data point generator operative to compute a sequence of model data points which the physical data, given predetermined information, can be expected to duplicate at each of a corresponding sequence of temporal sampling points;
a wayward point monitor including a processor operative for monitoring the physical data including identifying wayward points within said physical data that are incongruous with the predetermined information; and
an anomalous episode-prompted alarm generator operative for identifying anomalous episodes each including a cluster of wayward points satisfying predefined anomalous episode-defining criteria and generating an alarm for each anomalous episode identified.

9. A method according to claim 1 and also comprising identifying anomalous episodes each including a cluster of said wayward points satisfying predefined anomalous episode-defining criteria and using a processor to trigger a physical system action responsive to at least one anomalous episode identified.

10. A method according to claim 9 wherein said physical system action comprises a computerized change in at least one operating parameter of equipment associated with the physical data.

11. A method according to claim 9 wherein said physical system action comprises computerized suspension of operation of equipment associated with said physical data.

12. A method according to claim 9 wherein said physical system action comprises a computerized initiation of at least one of:
a data back-up process, for data associated with said physical data;
re-calibration for equipment associated with said physical data; and
at least one predetermined test to diagnose reasons for anomaly.

13. A method according to claim 9 wherein said physical system action comprises computerized launching of an emergency procedure.

14. A method according to claim 9 wherein said physical system action is generated or not generated for an individual anomalous episode depending on at least one characteristic of at least one anomalous episode found to date.

15. A method according to claim 14 wherein said characteristic comprises a probability of at least said individual anomalous episode occurring by chance.

16. A method according to claim 9 wherein said physical system action comprises computerized generation of at least one of:
an anomaly event alert for an external system; and
an anomaly event alert for a human operator.

17. A method according to claim 6 wherein said physical data comprises ambient temperature data generated by the satellite.

18. A method according to claim 1 and also comprising using said physical data generator to generate said physical data.

19. A method according to claim 2 and also comprising identifying as wayward points, those points within said sequence of residual data points whose divergence from zero conforms to a waywardness criterion.

20. A method according to claim 2 and also comprising identifying as wayward points, those points within said sequence of residual data points which diverge, at a level exceeding a threshold value, from the standard deviation of the residual data.

21. A method according to claim 20 wherein said threshold value is determined based on the number of points in said physical data.

22. A method according to claim 18 wherein said residual data points each define a divergence from zero and wherein said waywardness criterion comprises divergence from zero, of a point within said sequence of residual data points, which is larger, by a threshold amount, than most other residual data points' divergences from zero.

23. A computer program product, comprising a computer usable medium having a computer readable program code embodied therein, said computer readable program code adapted to be executed to implement a computerized method for monitoring physical data, generated by a physical data generator, for anomalies, said physical data being predictable subject to predetermined information characterizing said physical data generator, the method comprising:

using said predetermined information to compute a sequence of predicted data points which the physical data, given said predetermined information, can be expected to duplicate at each of a corresponding sequence of temporal sampling points; and receiving the physical data and identifying wayward points within said physical data which are incongruous with the predetermined information.

24. A method according to claim 1 and wherein said predictable data exhibits a known behavior which is not periodic.

25. A method according to claim 1 and also comprising identifying onset of at least one special events whose effect on the physical data is at least partly known but whose onset is not known.

26. A method according to claim 25 and also comprising:

subtracting at least one predicted data point, of at least one of said special events, from a corresponding physical data point thereby to generate a sequence of residual data points defining noise; and identifying as wayward points, those points which diverge from the noise by M standard deviations of the residual data, where M is higher than expected given N.

27. A method according to claim 2 wherein said data are characterized by periodic variations and said periodic variations are taken into account when identifying wayward points.

* * * * *